United States Patent
Takemura et al.

(10) Patent No.: US 10,095,934 B2
(45) Date of Patent: Oct. 9, 2018

(54) IN-VEHICLE DEVICE

(71) Applicant: CLARION CO., LTD., Saitama (JP)

(72) Inventors: Masayuki Takemura, Tokyo (JP);
Masahiro Kiyohara, Tokyo (JP); Shoji Muramatsu, Saitama (JP); Kota Irie, Saitama (JP); Yasuhiro Akiyama, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 259 days.

(21) Appl. No.: 14/904,997

(22) PCT Filed: Jun. 13, 2014

(86) PCT No.: PCT/JP2014/065770
§ 371 (c)(1),
(2) Date: Jan. 14, 2016

(87) PCT Pub. No.: WO2015/008566
PCT Pub. Date: Jan. 22, 2015

(65) Prior Publication Data
US 2016/0162740 A1    Jun. 9, 2016

(30) Foreign Application Priority Data
Jul. 18, 2013   (JP) .................................. 2013-149747

(51) Int. Cl.
*H04N 5/00* (2011.01)
*G06K 9/00* (2006.01)
(Continued)

(52) U.S. Cl.
CPC ......... *G06K 9/00791* (2013.01); *B60R 11/04* (2013.01); *H04N 5/225* (2013.01)

(58) Field of Classification Search
CPC ........ H04N 7/18; H04N 7/181; B60Q 1/0023; B60Q 1/1423; B60Q 1/20;
(Continued)

(56) References Cited

U.S. PATENT DOCUMENTS 5,059,796 A * 10/1991 Nakamura ........... G08B 13/194
                                                          250/330
6,681,163 B2 * 1/2004 Stam ..................... B60Q 1/143
                                                          250/208.1
(Continued)

FOREIGN PATENT DOCUMENTS

JP   2008-064630 A    3/2008
JP   2010-244382 A   10/2010
(Continued)

OTHER PUBLICATIONS

The Extended European Search Report dated Feb. 17, 2017 in the EP application No. 14826384.1.

*Primary Examiner* — Frank F Huang
(74) *Attorney, Agent, or Firm* — Volpe and Koenig, P.C.

(57) ABSTRACT

An in-vehicle device includes: an image acquisition unit that obtains a captured image from a camera that captures, via a camera lens, an image of a surrounding environment around a vehicle; an accumulation detection unit that individually detects a plurality of types of accumulation settled at the camera lens based upon the captured image; an image recognition unit that recognizes an object image, expressing a specific object present in the surrounding environment, in the captured image; a detection results integrating unit that calculates integrated detection results by integrating a plurality of sets of detection results based upon various sets of detection results pertaining to detection of the plurality of types of accumulation provided by the accumulation detection unit; and an operation control unit that controls opera-
(Continued)

tion executed by the image recognition unit based upon the integrated detection results.

8 Claims, 17 Drawing Sheets

(51) Int. Cl.
*H04N 5/225* (2006.01)
*B60R 11/04* (2006.01)

(58) Field of Classification Search
CPC ........ B60Q 2300/146; B60Q 2300/312; B60Q 2300/314; B60R 11/04; B60R 1/00; B60R 2300/30; B60R 2300/8053; B60S 1/0822; B60S 1/0844; B60S 1/023; B60S 1/04; G06K 9/00791
See application file for complete search history.

(56) References Cited

U.S. PATENT DOCUMENTS

| | | | | |
|---|---|---|---|---|
| 2004/0030476 | A1* | 2/2004 | Oswald | B60R 21/013 701/45 |
| 2006/0146178 | A1 | 7/2006 | Ishiga | |
| 2007/0115357 | A1* | 5/2007 | Stein | B60Q 1/0023 348/148 |
| 2007/0222566 | A1* | 9/2007 | Tsuji | G06K 9/00369 340/435 |
| 2010/0208075 | A1* | 8/2010 | Katsuno | B60Q 9/005 348/148 |
| 2011/0140919 | A1* | 6/2011 | Hara | B60Q 1/50 340/907 |
| 2013/0070966 | A1 | 3/2013 | Ehlgen et al. | |
| 2013/0092758 | A1 | 4/2013 | Tanaka et al. | |
| 2014/0147007 | A1 | 5/2014 | Hayakawa et al. | |

FOREIGN PATENT DOCUMENTS

| | | |
|---|---|---|
| JP | 2011-223075 A | 11/2011 |
| JP | 2012-038048 A | 2/2012 |
| JP | 2013-100077 A | 5/2013 |
| WO | 2005/022901 A1 | 3/2005 |
| WO | 2013/018673 A1 | 2/2013 |
| WO | 2014/007153 A1 | 1/2014 |
| WO | 2014/007286 A1 | 1/2014 |
| WO | 2014/017403 A1 | 1/2014 |

* cited by examiner (a)

(b)

IN-VEHICLE DEVICE

TECHNICAL FIELD

The present invention relates to an in-vehicle device.

BACKGROUND ART

There is an in-vehicle device known in the related art that captures an image of an area ahead of a vehicle via a camera installed at the vehicle, executes edge detection so as to detect a horizontal edge in the captured image and detects a lane mark (a lane demarcation line) on the road surface (PTL1). This device extracts a pixel, at which the absolute value representing the luminance difference between the luminance value thereof and the luminance value at a pixel adjacent to the pixel along the horizontal direction exceeds a threshold value, as an edge point and recognizes a lane mark based upon the number of such edge points.

In addition, there is a method known in the related art through which foreign matter or the like settled on an in-vehicle camera lens is detected by detecting, based upon the state of the in-vehicle camera lens, an immobile area in a captured image that remains immobile even while the vehicle is traveling (PTL2). There is also a method known in the related art through which a decision is made that water drops are present by using an overlapping image-capturing region shared by a plurality of cameras (PTL3).

CITATION LIST

Patent Literature

PTL1: Japanese Laid Open Patent Publication No. 2010-244382
PTL2: Japanese Laid Open Patent Publication No. 2012-38048
PTL3: Japanese Laid Open Patent Publication No. 2011-223075

SUMMARY OF INVENTION

Technical Problem

While the methods such as those disclosed in PTL2 and PTL3 each individually enable detection of dirt build-up on a lens, it may be difficult to correctly detect, for instance, a combination build-up of water drops and mud mixed together, and take optimal action accordingly.

Solution to Problem

According to the 1st aspect of the present invention, an in-vehicle device comprises: an image acquisition unit that obtains a captured image from a camera that captures, via a camera lens, an image of a surrounding environment around a vehicle; an accumulation detection unit that individually detects a plurality of types of accumulation settled at the camera lens based upon the captured image; an image recognition unit that recognizes an object image, expressing a specific object present in the surrounding environment, in the captured image; a detection results integrating unit that calculates integrated detection results by integrating a plurality of sets of detection results based upon various sets of detection results pertaining to detection of the plurality of types of accumulation provided by the accumulation detection unit; and an operation control unit that controls operation executed by the image recognition unit based upon the integrated detection results.

According to the 2nd aspect of the present invention, it is preferred that in the in-vehicle device according to the 1st aspect, the detection results integrating unit individually projects the various sets of detection results provided by the accumulation detection unit onto a single coordinate system and sets composite coordinates on the coordinate system based upon a plurality of sets of coordinates obtained through projection; and the operation control unit controls the operation executed by the image recognition unit based upon the composite coordinates.

According to the 3rd aspect of the present invention, it is preferred that in the in-vehicle device according to the 2nd aspect, the coordinate system assumes a first coordinate axis pertaining to a lens transmission factor affected by the accumulations and a second coordinate axis pertaining to an accumulation area occupied by accumulations settled on the camera lens; and the various sets of detection results provided by the accumulation detection unit are each represented by the lens transmission factor and the accumulation area, and a range to be assumed for coordinates determined based upon the detection results represented by two values is individually set in correspondence to each of the plurality of types of accumulation.

According to the 4th aspect of the present invention, it is preferred that in the in-vehicle device according to the 3rd aspect, the operation control unit determines control to be executed for the image recognition unit based upon whether the composite coordinates are closer to that first coordinate axis or to the second coordinate axis.

According to the 5th aspect of the present invention, it is preferred that in the in-vehicle device according to the 3rd aspect, when the composite coordinates fall into a range defined by an operation selection range set in advance within the range determined by the first coordinate axis and the second coordinate axis, the operation control unit suspends recognition of the object image expressing the specific object by the image recognition unit.

According to the 6th aspect of the present invention, it is preferred that in the in-vehicle device according to the 3rd aspect, when the composite coordinates fall into a range defined by an operation selection range set in advance within the range determined by the first coordinate axis and the second coordinate axis, the operation control unit engages a removal device in operation to remove accumulations from the camera lens.

According to the 7th aspect of the present invention, it is preferred that in the in-vehicle device according to any one of the 1st through 6th aspects, the accumulation detection unit further calculates reliability indices each corresponding to a length of time over which one of the plurality of types of accumulation has been continuously detected; and the detection results integrating unit calculates the integrated detection results by using the reliability indices calculated by the accumulation detection unit as well.

According to the 8th aspect of the present invention, the in-vehicle device according to the 7th aspect may further comprise: an environment detection unit that detects an environment in which the reliability indices are bound to decrease due to a factor related to at least one of a light source environment around the vehicle, a traveling road upon which the vehicle is traveling and weather; and a reliability index correction unit that individually corrects, based upon the environment detected by the environment detection unit, the reliability indices calculated by the accumulation detection unit.

According to the 9th aspect of the present invention, the in-vehicle device according to any one of the 1st through 6th aspects may further comprise: an information detection unit that obtains information pertaining to traveling conditions that include at least a speed of the vehicle or a yaw rate of the vehicle; and a detection suspending unit that suspends, based upon the information pertaining to the traveling conditions obtained by the information detection unit, detection of some accumulation among the plurality of types of accumulation, wherein: the detection results integrating unit calculates the integrated detection results based upon accumulation detection results pertaining to accumulations, among the plurality of types of accumulation, detection of which has not been suspended by the detection suspending unit.

According to the 10th aspect of the present invention, the in-vehicle device according to the 9th aspect may further comprise: a stationary state decision-making unit that determines, based upon the information pertaining to the speed of the vehicle obtained by the information detection unit, that the vehicle is in a stationary state; and an initializing unit that initializes the detection results provided by the accumulation detection unit when the vehicle, determined to have been continuously in a stationary state over a length of time equal to or greater than a predetermined time length by the stationary state decision-making unit, starts up.

Advantageous Effect of the Invention

According to the present invention, even a combination build-up can be correctly detected as a dirt build-up and the operation executed by the image recognition unit can be optimally controlled.

DESCRIPTION OF EMBODIMENTS

Figure 1:
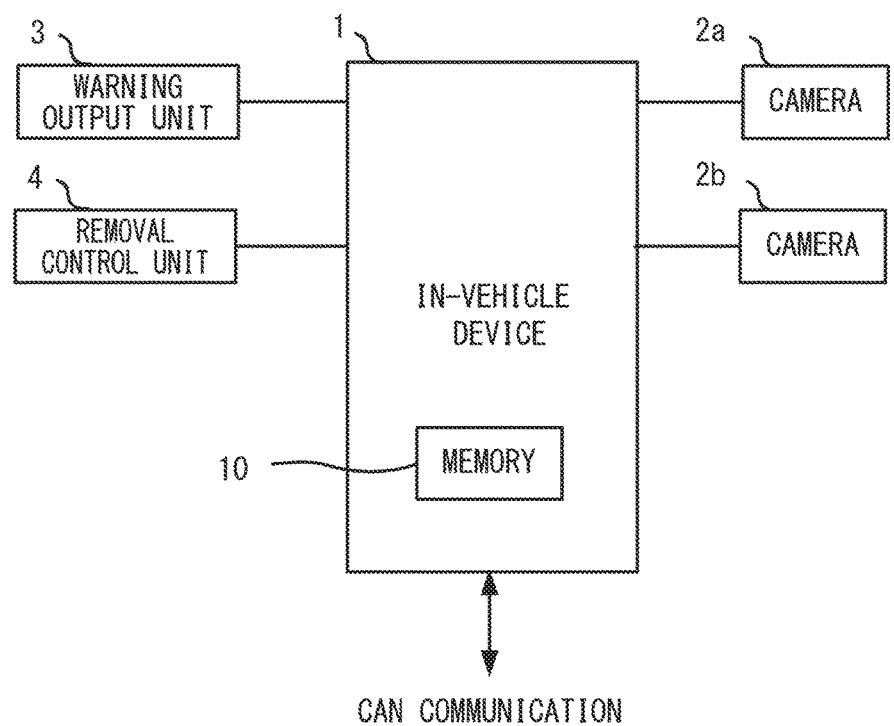
FIG. 1 A block diagram showing the configuration of an in-vehicle device achieved in an embodiment of the present invention FIG. 2 A functional block diagram pertaining to the in-vehicle device achieved in the embodiment of the present invention FIG. 3 Diagrams in reference to which the processing executed by the water drop detection unit will be described FIG. 4 A diagram in reference to which the processing executed by the clouding detection unit will be described FIG. 5 A diagram in reference to which the processing executed by the projection conversion unit will be described FIG. 6 A diagram in reference to which the processing executed by the composite coordinate setting unit will be described FIG. 7 A diagram in reference to which the processing executed by the operation control unit will be described FIG. 8 A functional block diagram pertaining to the environment detection control unit FIG. 9 A flowchart pertaining to the processing executed by the light source environment detection unit FIG. 10 A diagram indicating the processing area set for the light source environment detection unit FIG. 11 A flowchart pertaining to the processing executed by the traveling road environment detection unit FIG. 12 A flowchart pertaining to the processing executed by the weather detection unit FIG. 13 A flowchart pertaining to the processing executed by the environment detection control unit FIG. 14 A flowchart pertaining to the processing executed by the lane recognition unit FIG. 15 A diagram in reference to which the processing executed by the lane recognition unit will be described FIG. 16 A flowchart pertaining to the processing executed by the vehicle recognition unit FIG. 17 A flowchart pertaining to the operation executed in the in-vehicle device

FIG. 1 is a block diagram illustrating the configuration of an in-vehicle device 1 achieved in an embodiment of the present invention. The in-vehicle device 1 in FIG. 1 is an ECU (electric control unit) installed in a vehicle that is comprised of a CPU and a memory 10. The memory 10 includes a ROM and a RAM, which is used as a working memory and a buffer memory, with a program executed by the CPU in the in-vehicle device 1 and information related to a control map, to be described in detail later, stored in the ROM.

The in-vehicle device 1 is connected to cameras 2a and 2b, a warning output unit 3 and a removal control unit 4. The in-vehicle device 1 is also connected to a CAN (controller area network) and thus is able to obtain information from a car navigation system, an ECU with a higher-order designation relative to the in-vehicle device 1 or the like. The in-vehicle device 1 is able to obtain, for instance, information pertaining to the vehicle such as the vehicle traveling speed, the yaw rate and the wiper operating state through the CAN.

The cameras 2a and 2b are each installed at a specific part of the vehicle such as the body or the bumper. The camera 2a is installed with the camera lens oriented toward an area ahead of the vehicle and assumes an angle of view wide enough to allow it to capture images of the road surface ahead of the vehicle and road signs along the road ahead of the vehicle. The camera 2b is installed with the camera lens oriented rearward relative to the vehicle and assumes an angle of view wide enough to allow it to capture images of the road surface behind the vehicle and the landscape behind the vehicle.

The in-vehicle device 1 executes image recognition processing in captured images provided from the camera 2a and the camera 2b so as to recognize images of a lane mark, another vehicle, a pedestrian, a road sign, a parking space and the like in the captured images. The term "lane mark" in this context refers to a lane demarcation line, a road center line or a road edge marking, formed with paint, stud reflectors or the like. Based upon the results of the image recognition processing, the in-vehicle device 1 is able to detect that the vehicle is about to depart the lane in which it is currently traveling or that the vehicle is about to collide with another vehicle.

Water drops, mud, a snow-melting agent or the like may settle onto the camera lenses in the cameras 2a and 2b. While the vehicle is traveling, in particular, water, mud, a snow-melting agent or the like on the road is more likely to be splashed up onto the vehicle and settle on a camera lens. Water drops settling on the camera lens such as rain drops are likely to contain a great deal of impurities and when they dry they may form water stains on the camera lens. In addition, water stains and muddy water on the camera lens may cause clouding at the camera lens. In the following description, foreign matter such as water drops, water stains and mud settled on the camera lens and a build-up on the camera lens such as clouding will be collectively referred to as accumulations.

The warning output unit 3 outputs a warning for the driver of the vehicle via a warning lamp, a warning buzzer, a warning display screen or the like. The removal control unit 4 controls removal devices such as an air pump, a washer pump and a wiper drive unit (none shown), engaged in operation to remove accumulations from the camera lenses at the cameras 2a and 2b. The removal control unit 4 controls a removal device based upon a command issued by the in-vehicle device 1 so as to engage it in a compressed air or cleaning solution injecting operation, a wiping operation via a lens wiper, or the like, in an attempt at accumulation removal from the camera lens at the camera 2a or the camera 2b.

Figure 2:
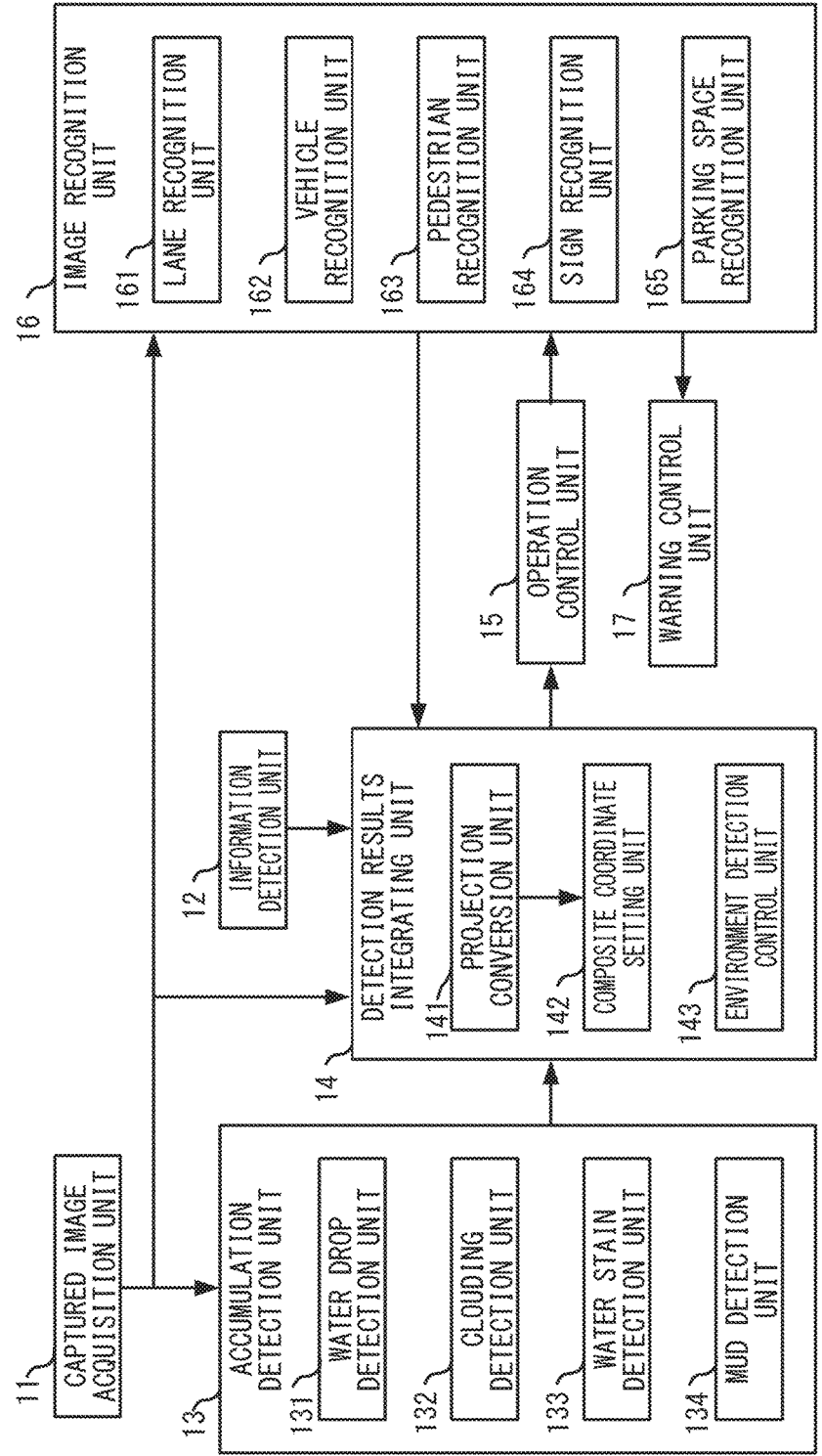

FIG. 2 is a functional block diagram pertaining to the in-vehicle device 1. The in-vehicle device 1, executing a program stored in the memory 10, is able to function as a captured image acquisition unit 11, an information detection unit 12, an accumulation detection unit 13, a detection results integrating unit 14, an operation control unit 15, an image recognition unit 16 and a warning control unit 17.

The captured image acquisition unit 11 individually obtains captured images from the camera 2a and the camera 2b at a predetermined frame rate. The captured image acquisition unit 11 outputs the captured images, each having been obtained in correspondence to a given frame, to the accumulation detection unit 13, the detection results integrating unit 14 and the image recognition unit 16.

The information detection unit 12 obtains, via the CAN, information such as the subject vehicle speed, the yaw rate, the steering angle, the wiper operating state and the outside air temperature, from an ECU or the like, with a higher-order designation relative to the in-vehicle device 1. The information detection unit 12 outputs the information thus obtained to the detection results integrating unit 14.

The accumulation detection unit 13, which includes a water drop detection unit 131, a clouding detection unit 132, a water stain detection unit 133 and a mud detection unit 134, detects, through the captured images output from the captured image acquisition unit 11, various types of accumulation such as water drops, clouding, water stains and dirt, present on the camera lenses at the cameras 2a and 2b. The water drop detection unit 131, the clouding detection unit 132, the water stain detection unit 133 and the mud detection unit 134 output the respective detection results to the detection results integrating unit 14. The water drop detection unit 131, the clouding detection unit 132, the water stain detection unit 133 and the mud detection unit 134 will be individually described in detail later.

The detection results integrating unit 14 includes a projection conversion unit 141, a composite coordinate setting unit 142 and an environment detection control unit 143. The detection results integrating unit 14 determines a single set of information pertaining to dirt build-up conditions at the camera lens in each of the cameras 2a and 2b by integrating the various sets of detection results provided by the accumulation detection unit 13 and outputs the two sets of information individually to the operation control unit 15. The projection conversion unit 141, the composite coordinate setting unit 142 and the environment detection control unit 143 will be described in detail later.

The operation control unit 15 controls the operation executed by the image recognition unit 16 based upon the information pertaining to the dirt build-up conditions at the camera lenses at the cameras 2a and 2b, having been output from the detection results integrating unit 14. The image recognition unit 16, which includes a lane recognition unit 161, a vehicle recognition unit 162, a pedestrian recognition unit 163, a sign recognition unit 164 and a parking space recognition unit 165, recognizes images of objects such as a lane mark, another vehicle, a pedestrian, a road sign and lines defining a parking space in the captured images output from the captured image acquisition unit 11.

The operation control unit 15 determines which countermeasures, i.e., non-detection countermeasures that allow various recognition targets to be recognized more readily, or erroneous detection countermeasures that ensure that the various recognition targets are recognized less readily, are to be taken for the image recognition unit 16. The non-detection countermeasures and the erroneous detection countermeasures are both made up with three separate phases. In the following description, each phase in the non-detection countermeasures and the erroneous detection countermeasures will be referred to as a suppression mode.

In a first suppression mode, control parameters pertaining to the recognition sensitivity of the image recognition unit 16 are adjusted. The control parameters adjusted in this mode are defined in correspondence to the individual units included in the image recognition unit 16, as will be explained later. In a second suppression mode, control under which the control parameters related to the recognition sensitivity of the image recognition unit 16 are greatly adjusted relative to those in the first suppression mode, control under which an area where an accumulation is detected in a captured image is excluded from the processing area for the image recognition unit 16, and the like are executed. In a third suppression mode, control under which the removal control unit 4 is engaged in accumulation removal and control under which image recognition by the image recognition unit 16 is abandoned, are executed.

Since the detection results integrating unit 14 outputs a single set of information pertaining to the dirt build-up conditions at each camera lens, the operation control unit 15 is able to execute recognition sensitivity control for the image recognition unit 16 without any contradiction.

The warning control unit 17 issues a warning by engaging the warning output unit 3 in operation based upon the recognition results provided by the image recognition unit 16. For instance, if the vehicle is judged to be about to depart the current traveling lane, or be in danger of colliding with another vehicle or if the image recognition by the image recognition unit 16 is to be abandoned, a warning is output via the warning output unit 3.

(Water Drop Detection Unit 131)

Figure 3:
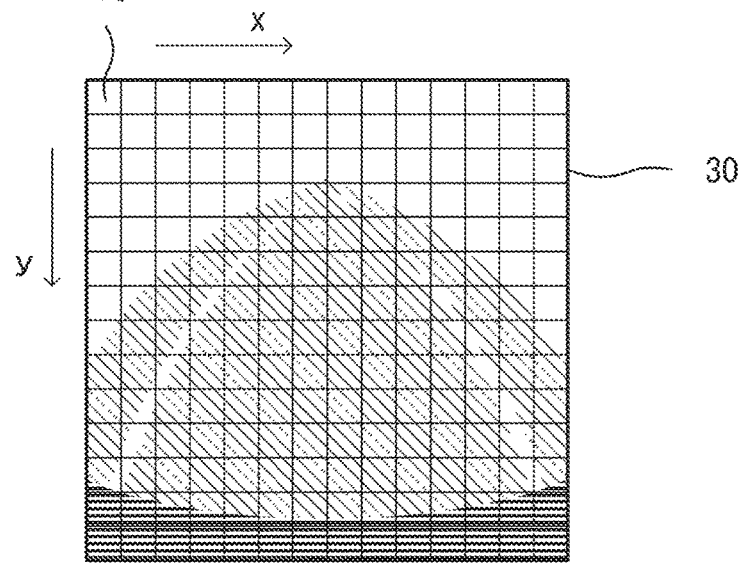
Figure 3:
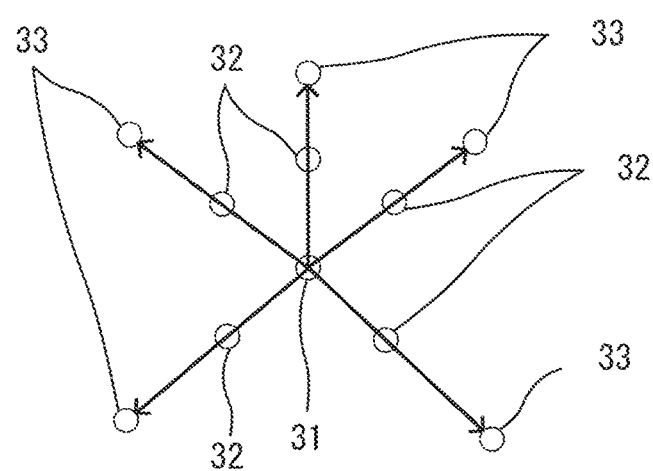

In reference to FIG. 3(a) and FIG. 3(b), the operation executed by the water drop detection unit 131 will be described. As FIG. 3(a) indicates, the water drop detection unit 131 divides the image area in a captured image 30 into a plurality of blocks B(x, y). The blocks B(x, y) each include a plurality of pixels in the captured image.

The water drop detection unit 131 calculates a score $S_1(x, y)$ indicating a water drop presence time count in correspondence to each block B(x, y). The score $S_1(x, y)$ takes on an initial value of 0 and increases by a predetermined value each time it is decided that a water drop is present in the particular block B(x, y) through the decision-making processing described below.

The water drop detection unit 131 calculates the score for each pixel as described below. FIG. 3(b) shows a given pixel 31 designated as a target point. The water drop detection unit 131 sets pixels each set apart from the target point 31 by a predetermined distance (e.g., by three pixels), along the upward direction, a right-upward direction, a right-downward direction, a left-upward direction and a left-downward direction, as inner reference points 32, and also sets pixels further set apart by a predetermined distance (e.g., by another three pixels) along these five directions as outer reference points 33. Next, the water drop detection unit 131 calculates a luminance value for each of the inner reference points 32 and the outer reference points 33.

Due to a lens effect, the center of a water drop is highly likely to be brighter than the edge of the water drop. Accordingly, the water drop detection unit 131 makes a decision as to whether or not the luminance at the inner reference point 32 is higher than luminance at the corresponding outer reference point 33 along each of the five directions. In other words, the water drop detection unit 131 makes a decision as to whether or not the target point 31 is located at the center of the water drop. If the luminance at the inner reference point 32 set in each direction is higher than the luminance at the outer reference point 33 set along the matching direction, the water drop detection unit 131 increases the score $S_1(x, y)$ for the block $B(x, y)$ containing the particular target point 31 by a predetermined value of, for instance, 1.

Once the decision-making processing is executed as described above for all the pixels in the captured image, the water drop detection unit 131 obtains an elapsed time $t_1$, having elapsed since initialization of the score $S_1(x, y)$ for each block $B(x, y)$ was last initialized from the environment detection control unit 143, which will be described in detail later. Then, the water drop detection unit 131 calculates a time average $S_1(x, y)/t_1$ for the score $S_1(x, y)$ by dividing the score $S_1(x, y)$ for each block $B(x, y)$ by the elapsed time $t_1$. The water drop detection unit 131 then calculates the total sum of the time averages $S_1(x, y)/t_1$ of all the blocks $B(x, y)$ and further calculates an average score $A_{S1}$ by dividing the total sum by the number of all the blocks in the captured image 30.

If water drops are continuously present at the camera lens, the average score $A_{S1}$ increases in each subsequent frame. In other words, a greater average score $A_{S1}$ indicates a higher probability of water drops present at the camera lens over a greater length of time. The water drop detection unit 131 generates, based upon the average score $A_{S1}$, a reliability index $R_1$ pertaining to the detection results provided by the water drop detection unit 131. When the vehicle is traveling under conditions in which rainwater readily contacts the camera lens, water drops may slide down over the lens and thus, the scores $S_1(x, y)$ may readily fluctuate. For this reason, the amount of water present on the lens is determined based upon the average score $A_{S1}$. Regarding the reliability index $R_1$, raindrops differ from mud and clouding in that lens conditions affected by them tend to change significantly and the score $S_1(x, y)$ may temporarily decrease even in rainy weather. Accordingly in consideration of such characteristics of raindrops, a time count $C_{S1}$, through which the average score $A_{S1}$ continuously exceeds a predetermined value $TA_{S1}$ is used. The water drop detection unit 131 sustains the time count $C_{S1}$ even if the average score $A_{S1}$ becomes less than the predetermined value $TA_{S1}$ over a predetermined length of time and only decreases the score $S_1(x, y)$ if the average score $A_{S1}$ remains less than the predetermined value over a length of time equal to or greater than the predetermined time length. The water drop detection unit 131 determines a threshold value AS1THR and calculates the reliability index $R_1=C_{S1}/AS1THR$. If the time count $C_{S1}$ exceeds AS1THR, the water drop detection unit 131 indicates 1 for the reliability index $R_1$. A reliability index value $R_1$ closer to 1 assures better reliability in the water drop accumulation detection.

Next, the water drop detection unit 131 detects any block among all the blocks $B(x, y)$, with the score $S_1(x, y)$ thereof taking a value equal to or greater than a predetermined value, and calculates the number $N_1$ of the blocks thus detected. The water drop detection unit 131 calculates the luminance differences, each representing the difference between the luminance at an inner reference point 32 and the luminance at the corresponding outer reference point 33, for all the pixels included in the $N_1$ blocks having been detected and then calculates an average luminance difference $A_{D1}$ of the luminance differences calculated for these pixels. Subsequently, the water drop detection unit 131 outputs detection results indicating the reliability index $R_1$, the number $N_1$ of blocks with scores $S_1(x, y)$ thereof equal to or greater than the predetermined value and the average luminance difference $A_{D1}$ to the detection results integrating unit 14.

(Clouding Detection Unit 132)

Figure 4:
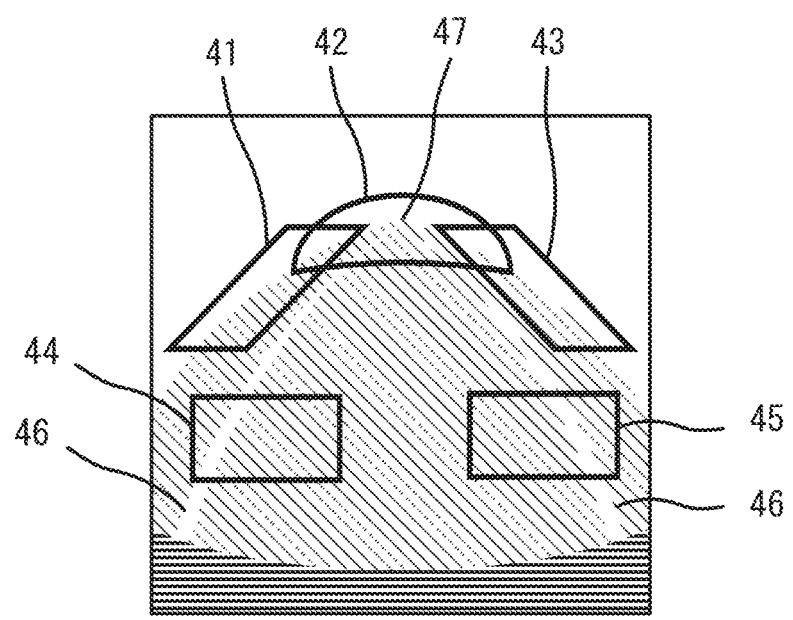

In reference to FIG. 4, the operation executed by the clouding detection unit 132 will be described. As shown in FIG. 4, the clouding detection unit 132 sets an upper left detection area 41, an upper detection area 42 and an upper right detection area 43 at a position at which the horizon is predicted to be included in the captured image. The upper detection area 42 is set at a position that includes the vanishing point of the two lane marks running parallel to each other on the road surface. In the example presented in FIG. 4, a vanishing point 47 of two lane marks 46 is included in the upper detection area 42. The upper left detection area 41 is set to the left of the upper detection area 42, whereas the upper right detection area 43 is set to the right of the upper detection area 42. In addition, the clouding detection unit 132 sets a lower left detection area 44 and a lower right detection area 45 at positions where the lane marks are expected to be in the captured image.

The clouding detection unit 132 executes horizontal edge detection processing for the pixels included in the upper left detection area 41, the upper detection area 42, the upper right detection area 43, the lower left detection area 44 and the lower right detection area 45. Through the edge detection executed for the upper left detection area 41, the upper detection area 42 and the upper right detection area 43, edges such as the horizon are detected. In addition, through the edge detection executed for the lower left detection area 44 and the lower right detection area 45, edges of the lane marks 46 and the like are detected. The clouding detection unit 132 calculates an edge intensity for each of the pixels in the various detection areas 41 through 45. The clouding detection unit 132 next calculates an average edge intensity value $A_{E2}$ in correspondence to each of the detection areas 41 through 45 and makes a decision as to whether or not the average value $A_{E2}$ is less than a predetermined threshold value ε. The clouding detection unit 132 judges that clouding is manifest in any detection area in which the average edge intensity value $A_{E2}$ is determined to be less than the threshold value ε.

The clouding detection unit 132 calculates the number $N_2$ of detection areas among the detection areas 41 through 45, each having an average edge intensity value $A_{E2}$ less than the threshold value ε, i.e., the number of detection areas where clouding has been detected. Subsequently, the clouding detection unit 132 calculates a time length t2 through which clouding is judged to have been continuously present in each of the detection areas 41 through 45. The clouding detection unit 132 then calculates an average continuous time length t3 by dividing the total sum of the time lengths t2, each corresponding to one of the detection areas 41 through 45 by the number of detection areas, i.e., five. The clouding detection unit 132 converts the average continuous time length t3 to a reliability index $R_2$ pertaining to the detection results provided by the clouding detection unit 132. For instance, the clouding detection unit 132 may preselect a specific time length TTHR3 and calculate $R_2$ as; $R_2=t_3/TTHR3$. When the average continuous clouding time length t3 is greater, the reliability index $R_2$ assures a higher level of reliability, i.e., it indicates with higher reliability that clouding is present. In addition, since $t_3$ represents the average continuous clouding time length calculated as an average among the five detection areas 41 through 45, the reliability of clouding detection increases when the continuous time lengths in all five detection areas 41 through 45 are greater. The reliability index $R_2$ takes on a numerical value within the range of 0 through 1, and if TTHR3<t3, the reliability index invariably takes on the value of 1, indicating that the reliability of the clouding detection is high.

Furthermore, the clouding detection unit 132 calculates an average edge intensity $A_{A2}$ by dividing the total sum of the average edge intensity values $A_{E2}$ corresponding to the detection areas where clouding has been detected by the number of detection areas, i.e., by five. The clouding detection unit 132 outputs detection results indicating the reliability index $R_2$, the number $N_2$ of detection areas where clouding has been detected and the average edge intensity $A_{A2}$ to the detection results integrating unit 14.

(Water Stain Detection Unit 133)

The operation executed by the water stain detection unit 133 will be described next. As does the water drop detection unit 131, the water stain detection unit 133 also divides the image area of the captured image 30 into a plurality of blocks B(x, y), as indicated in FIG. 3(a).

Next, the water stain detection unit 133 executes horizontal edge detection processing over the entire captured image 30 so as to generate edge intensity data indicating the edge intensity levels at the individual pixels. The water stain detection unit 133 then calculates the total sum of the edge intensity values at the pixels present in each of the blocks B(x, y) and adds a value determined based upon the total sum of the edge intensity values to a score $S_3(x, y)$ corresponding to the particular block B(x, y).

The water stain detection unit 133 obtains, from the environment detection control unit 143, an elapsed time length T8(x, y) having elapsed since the score $S_3(x, y)$ corresponding to each block B(x, y) exceeded an optimal threshold value. The water stain detection unit 133 then extracts the elapsed time lengths T8(x, y) in correspondence to the individual pixels, calculates their average TA8 and uses the average TA8 thus calculated for a reliability index.

The water stain detection unit 133 converts an average score $AS_3$ of the scores $S_3(x, y)$ over the entire image plane to an opacity rate. As water stains continuously remain on the camera lens, the average score $AS_3$ increases. In addition, when TA8, calculated by taking into consideration the continuous time lengths, is greater, the probability of water stains remaining on the camera lens over an extended period of time is higher. The water stain detection unit 133 determines a threshold value AS3THR and calculates a reliability index $R_3$ as; $R_3=TA8/AS3THR$. When the average score $AS_3$ pertaining to water stains over the entire image is higher and when TA8 exceeds AS3THR, the water stain detection unit 133 indicates the reliability with the reliability index $R_3$ at 1. When the reliability index $R_3$ takes a value closer to 1, the presence of detected water stains is assured with higher reliability. Furthermore, the average score $AS_3$ taking a greater value indicates that the luminance difference between the background and the water stains is significant and that the background is not readily discernible. The score conversion is executed so that when the average score takes a greater value, a higher value is indicated for the opacity rate on a map of a water stain range 53 at the projection conversion unit 141, as will be explained later.

The water stain detection unit 133 detects any block with the score $S_3(x, y)$ thereof indicating a value equal to or greater than a predetermined value among all the blocks B(x, y) and calculates the number $N_3$ of blocks thus detected. The number $N_3$ of these blocks is then converted to a dirt accumulation area. The water stain detection unit 133 converts the number of blocks to the accumulation area as; $N_3$/image plane area (pixels) by designating the image plane area as the denominator. The water stain detection unit 133 outputs detection results indicating the reliability index $R_3$, the average score $AS_3$ and the number $N_3$ of blocks with the scores $S_3(x, y)$ each indicating a value equal to or greater than the predetermined value to the detection results integrating unit 14.

(Mud Detection Unit 134)

The operation executed by the mud detection unit 134 will be described next. As does the water drop detection unit 131, the mud detection unit 134 also divides the image area of the captured image 30 into a plurality of blocks B(x, y), as indicated in FIG. 3(a).

Next, the mud detection unit 134 detects the luminance at each pixel in the captured image 30. The mud detection unit 134 then calculates a total sum $l_t(x, y)$ of the luminance values at the individual pixels included in each block B(x, y). The mud detection unit 134 then calculates a difference $\Delta l(x, y)$ between the total sum $l_t(x, y)$ calculated for each block B(x, y) in correspondence to the captured image in the current frame and the total sum $l_{t-1}(x, y)$ calculated for the same block B(x, y) in correspondence to the image captured for the preceding frame.

The mud detection unit 134 detects any block B(x, y) indicating a small value for $\Delta l(x, y)$ with its $l_t(x, y)$, indicating a value smaller than those calculated for the surrounding blocks, and increases the score $S_3(x, y)$ corresponding to this block B(x, y) by a predetermined value of, for instance, 1.

Once the decision-making processing is executed for all the pixels in the captured image as described above, the mud detection unit 134 obtains, from the environment detection control unit 143, a cumulative score value for a score $S_4(x, y)$ for each block B(x, y), accumulated over a predetermined time length t5. The mud detection unit 134 then calculates a time average $S_4(x, y)/t5$ for the score $S_4(x, y)$ of each of the blocks B(x, y) by dividing the score $S_4(x, y)$ by the predetermined time length t5. The mud detection unit 134 calculates the total sum of the time averages $S_4(x, y)/t5$ of all the blocks B(x, y) and then calculates an average score $AR_{S4}$ by dividing the total sum by the number of all the blocks in the captured image 30. The average score $AR_{S4}$ has a significance closely associated with the amount of mud accumulated on the lens over the predetermined time length. Accordingly, the mud detection unit 134 calculates the average value for $\Delta l(x, y)$ over the predetermined time length t5 and a predicted value indicating the extent to which the luminance is expected to change on the image plane based upon the surrounding light source environment, calculates predicted value for an average value divided by the extent of luminance change of $A_{S4}$ over a predetermined time length t5 as a transmission factor.

When mud is continuously present on the camera lens, the average score $AR_{S4}$ increases in each subsequent frame of captured image. In other words, an average score $AR_{S4}$ taking a greater value indicates a higher probability of a larger quantity of mud on the camera lens. In addition, the score $A_{S4}$ is utilized as an index indicating the transmission factor. Furthermore, a reliability index is determined based upon the length of time over which the score $A_{S4}$ exceeds a threshold value $TA_{S4}$. The mud detection unit 134 determines a threshold value AS4THR and calculates the reliability index $R_4$ as; $R_4=TA_{S4}/AS4THR$. If $TA_{S4}$ exceeds AS4THR, the mud detection unit 134 indicates the reliability with the reliability index $R_4$ at 1. When the value taken for the reliability index $R_4$ is closer to 1, the presence of detected mud is assured with greater reliability.

The mud detection unit 134 detects any block with the score $S_4(x, y)$ thereof indicating a value equal to or greater than a predetermined value among all the blocks $B(x, y)$ and calculates the number $N_4$ of blocks thus detected. The mud detection unit 134 outputs detection results indicating the reliability index $R_4$, the average score $A_{S4}$ and the number $N_4$ of blocks with the scores $S_4(x, y)$ each indicating a value equal to or greater than a predetermined value to the detection results integrating unit 14.

As described above, the lens dirt build-up conditions are detected individually via the water drop detection unit 131, the clouding detection unit 132, the water stain detection unit 133 and the mud detection unit 134. This means that if the individual sets of detection results were separately utilized for purposes of control operation correction and conflicting correction commands were issued, it would be difficult to execute optimal control operations and ultimately, white line detection operation and the like would not be executed with high accuracy based upon captured images.

Accordingly, in the embodiment, a single control command is generated by combining the plurality of sets of detection results via the projection conversion unit 141, as will be described below, so as to correct the control operations with this control command. In the embodiment, in order to generate a single control command based upon the plurality of sets of detection results, each set of detection results is normalized, a lens transmission factor and a dirt accumulation area over the lens surface are calculated as universal physical quantities commonly relevant to all sets of detection results and the control operations are corrected by determining the control command corresponding to these physical quantities.

(Projection Conversion Unit 141)

Figure 5:
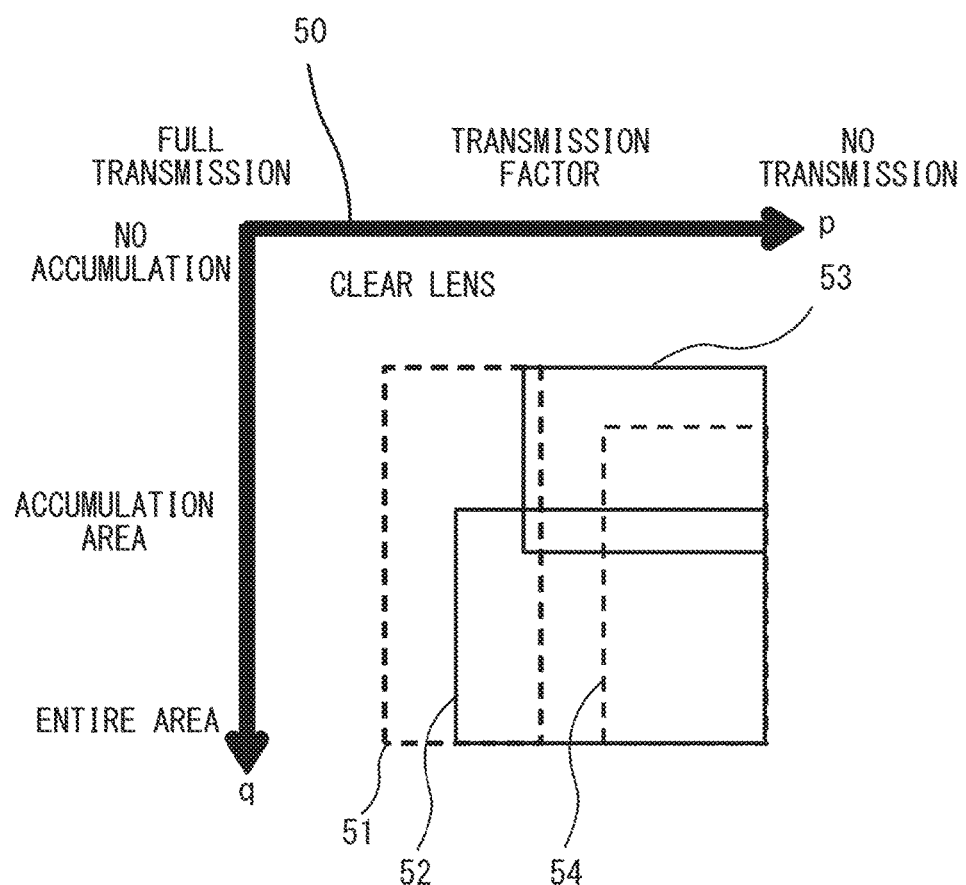

The projection conversion unit 141 projects the detection results provided from the various units in the accumulation detection unit 13 into a coordinate space shown in FIG. 5. The coordinate space in FIG. 5 is stored as a control map 50 in the memory 10. In the control map 50, a coordinate axis pertaining to the transmission factor affected by lens dirt accumulation and a coordinate axis pertaining to the accumulation area over which accumulations are built up on the camera lens are assumed. In the following description, a value taken along the coordinate axis pertaining to the transmission factor affected by lens dirt accumulation will be referred to as a p coordinate and a value taken along the coordinate axis pertaining to the accumulation area will be referred to as a q coordinate. In the control map 50, the lens dirt accumulation transmission factor indicates a higher degree of opacity further away from the origin point. In addition, the accumulation area increases further away from the origin point.

Furthermore, a water drop range 51 and a mud range 54, each indicated as a dotted-line rectangle, and a clouding range 52 and a water stain range 53, each indicated as a solid-line rectangle, are set in advance in the control map 50. Each set of detection results corresponding to a specific type of accumulation among the several different types of accumulation, provided via the various units in the accumulation detection unit 13, is represented as a lens transmission factor and an accumulation area, and a specific range for the coordinates determined based upon the detection results indicating these two values is set in correspondence to each type of accumulation detected by one of the various units in the accumulation detection unit 13.

The projection conversion unit 141 has a projection function $f_1$ and a projection function $g_1$. Through these projection functions $f_1$ and $g_1$, the detection results provided by the water drop detection unit 131 are projected and converted to coordinates on the two coordinate axes. The projection function $f_1$ converts the average luminance difference $A_{D1}$ to $p=0$ when the average luminance difference $A_{D1}$, one of the values indicated as the detection results from the water drop detection unit 131, is 0. In other words, through the projection function $f_1$, the average luminance difference $A_{D1}$ is set onto the coordinate axis pertaining to the accumulation area. If, on the other hand, the average luminance difference $A_{D1}$ is not 0, the projection function $f_1$ converts the average luminance difference $A_{D1}$ to a p coordinate $p_1$ falling within the range defined as the water drop range 51. A greater value is taken for $p_1$ as $A_{D1}$ increases.

When the number $N_1$, i.e., one of the values indicated as the detection results provided by the water drop detection unit 131, is 0, the projection function $g_1$ converts the number $N_1$ to $q=0$. Namely, through the projection function $g_1$, the number $N_1$ is set onto the coordinate axis pertaining to the transmission factor. If, on the other hand, the number $N_1$ is not 0, the projection function $g_1$ converts the number $N_1$ to a q coordinate $q_1$ falling within the range defined as the water drop range 51. A greater value is taken for $q_1$ as $N_1$ increases.

The projection conversion unit 141 may directly convert the detection results provided by the water drop detection unit 131 to coordinates falling within a specific range such as the water drop range 51. Namely, values determined as the lens transmission factor and the accumulation area based upon the detection results provided via the water drop detection unit 131 may be directly converted to a coordinate point among coordinate points set in advance in an XY coordinate system defining an operation map.

In addition, the projection conversion unit 141 has a projection function $f_2$ and a projection function $g_2$. Through these projection functions $f_2$ and $g_2$, the detection results provided by the clouding detection unit 132 are projected and converted to coordinates on the two coordinate axes. The projection function $f_2$ converts average edge intensity $A_{A2}$ to $p=0$ when the average edge intensity $A_{A2}$, one of the values indicated as the detection results from the clouding detection unit 132, is 0. If, on the other hand, the average edge intensity $A_{A2}$, is not 0, the projection function $f_2$ converts the average edge intensity $A_{A2}$ to a p coordinate $p_2$ falling within the range defined as the clouding range 52. A greater value is taken for $p_2$ as $A_{A2}$ increases.

When the number $N_2$, i.e., one of the values indicated as the detection results provided by the clouding detection unit 132, is 0, the projection function $g_2$ converts the number $N_2$ to $q=0$. If, on the other hand, the number $N_2$ is not 0, the projection function $g_2$ converts the number $N_2$ to a q coordinate $q_2$ falling within the range defined as the clouding range 52. A greater value is taken for $q_2$ as $N_2$ increases.

The projection conversion unit 141 may directly convert the detection results provided by the clouding detection unit 132 to coordinates falling within a specific range such as the water drop range 51. Namely, values determined as the lens transmission factor and the accumulation area based upon the detection results provided via the clouding detection unit 132 may be directly converted to a coordinate point among coordinate points set in advance in an XY coordinate system defining an operation map.

The projection conversion unit 141 adopts projection functions $f_3$ and $g_3$ through which the detection results provided by the water stain detection unit 133 are projected and converted. These projection functions $f_3$ and $g_3$, too, convert the detection results through projection to coordinates on the two coordinate axes, as do the projection functions described above. The projection function $f_3$ converts the average score $A_{S3}$ to p=0 when the average score $A_{S3}$, one of the values indicated as the detection results from the water stain detection unit 133, is 0. If, on the other hand, the average score $AS_3$ is not 0, the projection function $f_3$ converts the average score $AS_3$, to a p coordinate $p_3$ falling within the range defined as the water stain range 53. A greater value is taken for $p_3$ as $A_{s3}$ increases.

When the number $N_3$, i.e., one of the values indicated as the detection results provided by the water stain detection unit 133, is 0, the projection function $g_3$ converts the number $N_3$ to q=0. If, on the other hand, the number $N_3$ is not 0, the projection function $g_3$ converts the number $N_3$ to a q coordinate $q_3$ falling within the range defined as the water stain range 53. A greater value is taken for $q_3$ as $N_3$ increases.

The projection conversion unit 141 may directly convert the detection results provided by the water stain detection unit 133 to coordinates falling within a specific range such as the water drop range 51. Namely, values determined as the lens transmission factor and the accumulation area based upon the detection results provided via the water stain detection unit 133 may be directly converted to a coordinate point among coordinate points set in advance in an XY coordinate system defining an operation map.

The projection conversion unit 141 adopts projection functions $f_4$ and $g_4$ through which the detection results provided by the mud detection unit 134 are projected and converted. These projection functions $f_4$ and $g_4$, too, convert the detection results through projection to coordinates on the individual coordinate axes, as do the projection functions described above. The projection function $f_4$ converts the average score $A_{S4}$ to p=0 when the average score $A_{S4}$, one of the values indicated as the detection results from the mud detection unit 134, is 0. If, on the other hand, the average score $A_{S4}$, is not 0, the projection function $f_4$ converts the average score $A_{S4}$, to a p coordinate $p_4$ falling within the range defined as the mud range 54. A greater value is taken for $p_4$ as $A_{S4}$ increases.

When the number $N_4$, i.e., one of the values indicated as the detection results provided by the mud detection unit 134, is 0, the projection function $g_4$ converts the number $N_4$ to q=0. If, on the other hand, the number $N_4$ is not 0, the projection function $g_4$ converts the number $N_4$ to a q coordinate $q_4$ falling within the range defined as the mud range 54. A greater value is taken for $q_4$ as $N_4$ increases.

The projection conversion unit 141 may directly convert the detection results provided by the mud detection unit 134 to coordinates falling within a specific range such as the water drop range 51. Namely, values determined as the lens transmission factor and the accumulation area based upon the detection results provided via the mud detection unit 134 may be directly converted to a coordinate point among coordinate points set in advance in an XY coordinate system defining an operation map.

(Composite Coordinate Setting Unit 142)

The composite coordinate setting unit 142 integrates the coordinates $(p_1, q_1)$, the coordinates $(p_2, q_2)$, the coordinates $(p_3, q_3)$ and the coordinates $(p_4, q_4)$, obtained via the projection conversion unit 141 by converting, through projection, the detection results provided from the various units in the accumulation detection unit 13, based upon the reliability indices $R_1$, $R_2$, $R_3$ and $R_4$ output by the corresponding units in the accumulation detection unit 13 and thus calculates a single set of composite coordinates (P, Q). The composite coordinates (P, Q) are calculated as expressed below.

$$P=(p_1 \times R_1 + p_2 \times R_2 + p_3 \times R_3 + p_4 \times R_4)/(R_1+R_2+R_3+R_4)$$

$$Q=(q_1 \times R_1 + q_2 \times R_2 + q_3 \times R_3 + q_4 \times R_4)/(R_1+R_2+R_3+R_4)$$

The composite coordinates (P, Q) are output to the operation control unit 15 as information pertaining to dirt build-up conditions at the camera lens.

Figure 6:
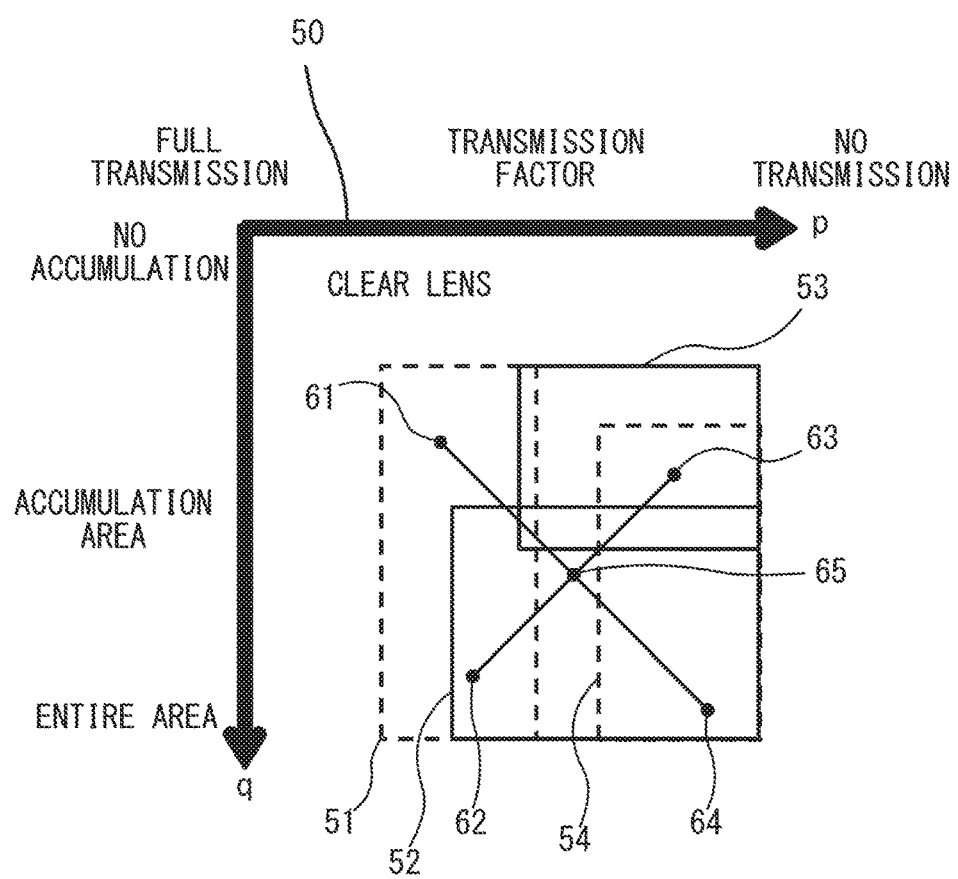

FIG. 6 presents an example of operation that may be executed by the composite coordinate setting unit 142. FIG. 6 shows coordinates 61 resulting from projection conversion of the detection results provided by the water drop detection unit 131, coordinates 62 resulting from projection conversion of the detection results provided by the clouding detection unit 132, coordinates 63 resulting from projection conversion of the detection results provided by the water stain detection unit 133 and coordinates 64 resulting from projection conversion of the detection results provided by the mud detection unit 134. Assuming that the reliability indices $R_1$, $R_2$, $R_3$ and $R_4$ take values equal to one another, the composite coordinates (P, Q) are set at a central position 65 located at a point on which the coordinates 61, the coordinates 62, the coordinates 63 and the coordinates 64 are centered in the example presented in FIG. 6. This central position 65 is the gravitational center of the coordinates 61, the coordinates 62, the coordinates 63 and the coordinates 64 determined based upon the reliability indices.

(Operation Control Unit 15)

The operation control unit 15 determines, based upon the composite coordinates (P, Q), whether to take the erroneous detection countermeasures or the non-detection countermeasures for the image recognition unit 16 and a specific phase of suppression mode in which the countermeasures are to be taken.

Figure 7:
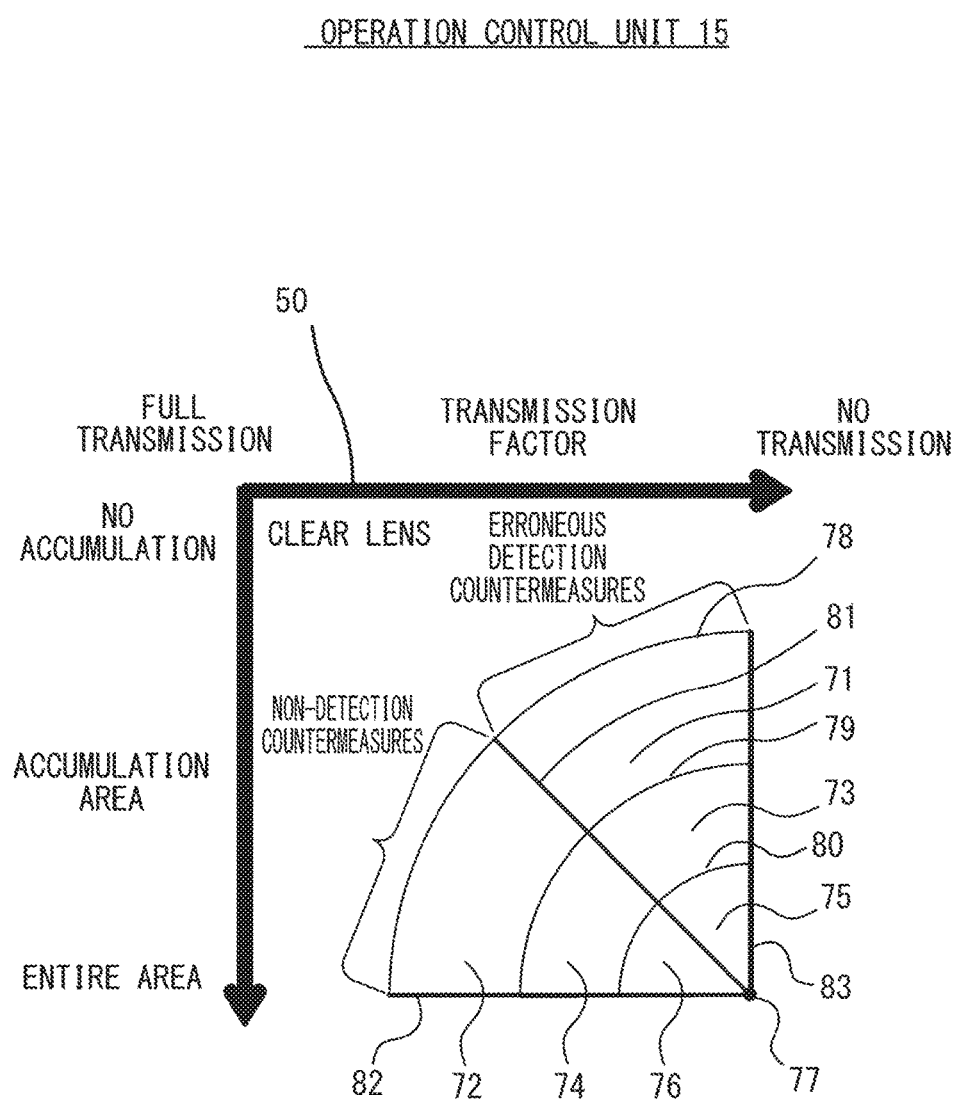

As FIG. 7 indicates, six operation selection ranges 71, 72, 73, 74, 75 and 76 are set in the control map 50. FIG. 7 shows coordinates 77 located furthest away from the origin point among the coordinates that may result from the projection conversion at the projection conversion unit 141 and three quarter circles 78, 79 and 80 centered on the coordinates 77. In the following description, the coordinates 77 will be referred to as a worst dirt build-up point 77. Among the quarter circles 78, 79 and 80, the quarter circle 78 assumes the greatest radius, the quarter circle 79 assumes the second largest radius and the quarter circle 80 assumes the smallest radius. In addition, a line segment 81 dividing each of the quarter circles 78, 79 and 80 into two equal portions, a line segment 82 extending parallel to the coordinate axis pertaining to the transmission factor and a line segment 83 extending parallel to the coordinate axis pertaining to the accumulation area are drawn out from the worst dirt build-up point 77 in FIG. 7.

(Erroneous Detection Countermeasures)

The operation selection range 71, set at a position closer to the transmission factor coordinate axis rather than to the accumulation area coordinate axis, is enclosed by the circumference of the quarter circle 78, the circumference of the quarter circle 79, the line segment 81 and the line segment 83. When the composite coordinates (P, Q) fall within the range defined as the operation selection range 71, the operation control unit 15 outputs an execution command for the image recognition unit 16 so as to engage the image recognition unit 16 in processing in an erroneous detection countermeasure first suppression mode.

The operation selection range 73, set at a position closer to the transmission factor coordinate axis rather than to the accumulation area coordinate axis, is enclosed by the circumference of the quarter circle 79, the circumference of the quarter circle 80, the line segment 81 and the line segment 83. When the composite coordinates (P, Q) fall within the range defined as the operation selection range 73, the operation control unit 15 outputs an execution command for the image recognition unit 16 so as to engage the image recognition unit 16 in processing in erroneous detection countermeasure second suppression mode.

The operation selection range 75, set at a position closer to the transmission factor coordinate axis rather than to the accumulation area coordinate axis, is enclosed by the circumference of the quarter circle 80, the line segment 81 and the line segment 83. When the composite coordinates (P, Q) fall within the range defined as the operation selection range 75, the operation control unit 15 outputs an execution command for the image recognition unit 16 so as to engage the image recognition unit 16 in processing in erroneous detection countermeasure third suppression mode.

(Non-Detection Countermeasures)

The operation selection range 72, set at a position closer to the accumulation area coordinate axis rather than to the transmission factor coordinate axis, is enclosed by the circumference of the quarter circle 78, the circumference of the quarter circle 79, the line segment 81 and the line segment 82. When the composite coordinates (P, Q) fall within the range defined as the operation selection range 72, the operation control unit 15 outputs an execution command for the image recognition unit 16 so as to engage the image recognition unit 16 in processing in non-detection countermeasure first suppression mode.

The operation selection range 74, set at a position closer to the accumulation area coordinate axis rather than to the transmission factor coordinate axis, is enclosed by the circumference of the quarter circle 79, the circumference of the quarter circle 80, the line segment 81 and the line segment 82. When the composite coordinates (P, Q) fall within the range defined as the operation selection range 74, the operation control unit 15 outputs an execution command for the image recognition unit 16 so as to engage the image recognition unit 16 in processing in non-detection countermeasure second suppression mode.

The operation selection range 76, set at a position closer to the accumulation area coordinate axis rather than to the transmission factor coordinate axis, is enclosed by the circumference of the quarter circle 80, the line segment 81 and the line segment 82. When the composite coordinates (P, Q) fall within the range defined as the operation selection range 76, the operation control unit 15 outputs an execution command for the image recognition unit 16 so as to engage the image recognition unit 16 in processing in non-detection countermeasure third suppression mode.

In other words, the operation control unit 15 determines whether to take the erroneous detection countermeasures or the non-detection countermeasures based upon whether the composite coordinates (P, Q) are closer to the transmission factor coordinate axis or to the accumulation area coordinate axis, and also determines a specific phase of suppression mode in which the particular countermeasures are to be taken based upon the distance between the worst dirt build-up point 77 and the composite coordinates (P, Q).

(Environment Detection Control Unit 143)

Figure 8:
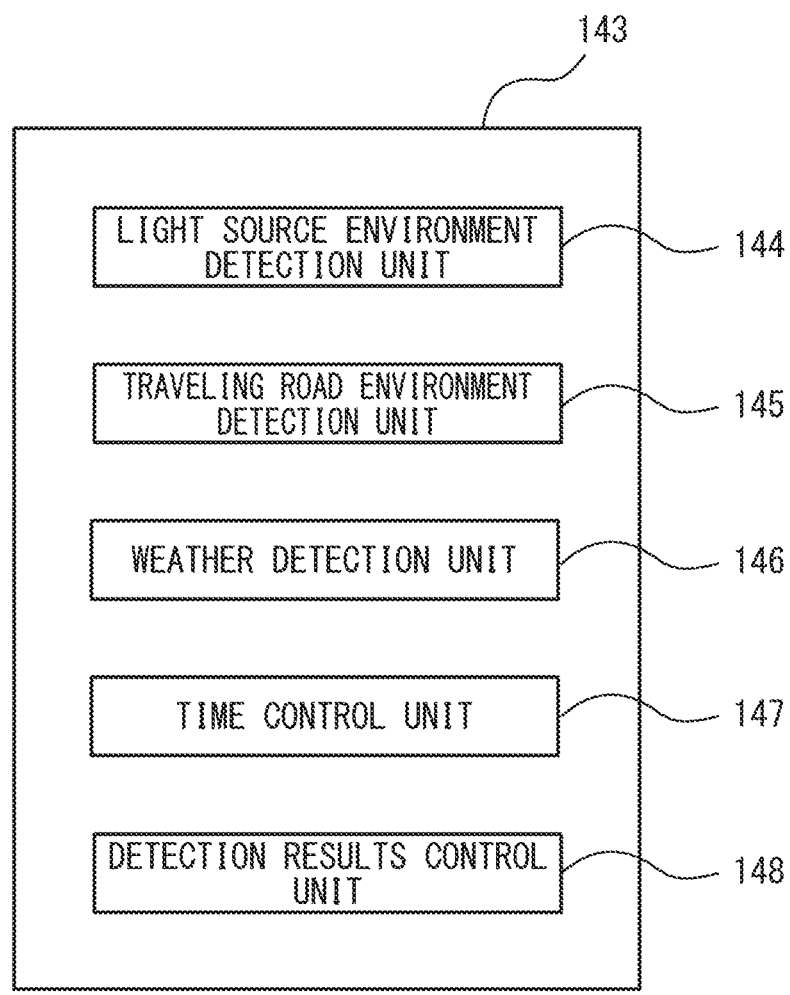

FIG. 8 is a control block diagram pertaining to the environment detection control unit 143. As FIG. 8 shows, the environment detection control unit 143 includes a light source environment detection unit 144, a traveling road environment detection unit 145, a weather detection unit 146, a time control unit 147 and a detection results control unit 148.

(Light Source Environment Detection Unit 144)

The light source environment detection unit 144 detects a light source environment in which the reliability indices $R_1$, $R_2$, $R_3$ and $R_4$, determined based upon the detection results provided by the accumulation detection unit 13 are likely to decrease readily. For instance, the light source environment detection unit 144 may detect a condition under which the camera 2a or the camera 2b is in a backlit state due to the setting sun, light reflected off the road surface, headlights from a vehicle behind the subject vehicle or the like.

Figure 9:
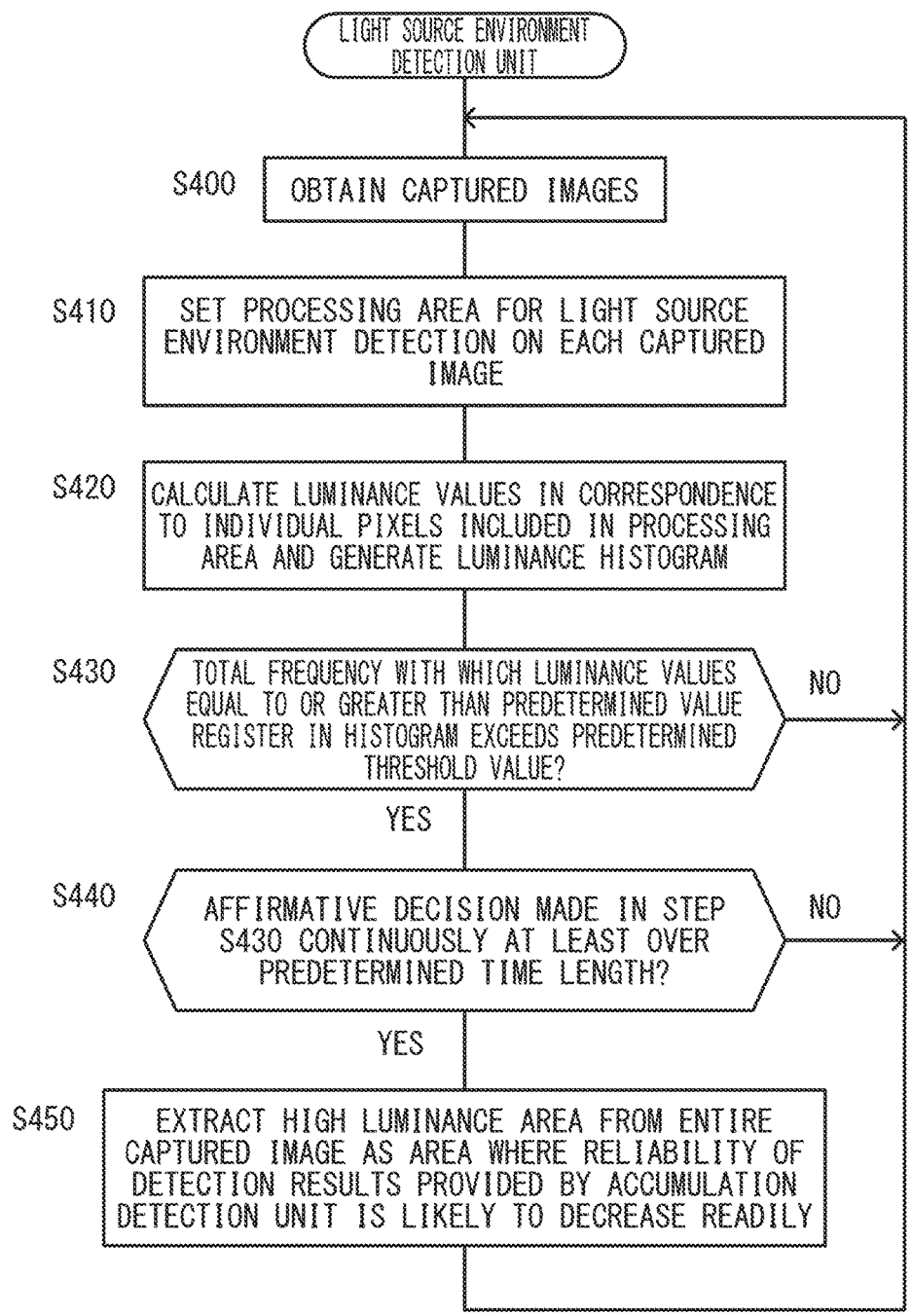

In reference to FIG. 9 and FIG. 10, the operation executed by the light source environment detection unit 144 will be described. FIG. 9 presents a flowchart of the processing executed by the light source environment detection unit 144. In step S400, the light source environment detection unit 144 obtains images captured at the cameras 2a and 2b. In step S410, the light source environment detection unit 144 sets a processing area, to be used for light source environment detection, over each of the captured images. In step S420, the light source environment detection unit 144 calculates a luminance value for each of the pixels included in the processing area having been set in step S410 and generates a histogram of the luminance values.

In step S430, the light source environment detection unit 144 makes a decision as to whether or not the total frequency with which luminance values equal to or greater than a predetermined value register in the histogram generated in step S420 exceeds a predetermined threshold value. If an affirmative decision is made in step S430, i.e., if the total sum representing the overall frequency with which luminance values equal to or greater than the predetermined luminance value exceeds the predetermined threshold value, the light source environment detection unit 144 proceeds to execute the processing in step S440. If, on the other hand, a negative decision is made in step S430, i.e., if the total sum for the frequency with which luminance values equal to or greater than the predetermined luminance value does not exceed the predetermined threshold value, the light source environment detection unit 144 proceeds to step S400 to obtain images captured for succeeding frames.

In step S440, the light source environment detection unit 144 makes a decision as to whether or not an affirmative decision has been made in step S430 on a continuing basis over a length of time equal to or greater than a predetermined time length. Until an affirmative decision is continuously made in step S430 over a length of time equal to or greater than the predetermined time length, the light source environment detection unit 144 makes a negative decision in step S440 and proceeds to step S400 to obtain images captured for succeeding frames. Once an affirmative decision is made in step S430 on a continuing basis over a length of time equal to or greater than the predetermined time length, the light source environment detection unit 144 proceeds to execute the processing in step S450.

In step S450, the light source environment detection unit 144 detects any high luminance area in the entire image area of each captured image and accordingly adjusts the reliability indices $R_1$, $R_2$, $R_3$ and $R_4$ determined based upon the detection results provided by the accumulation detection unit 13. Subsequently, the light source environment detection unit 144 proceeds to step S400 to obtain images captured for succeeding frames.

Figure 10:
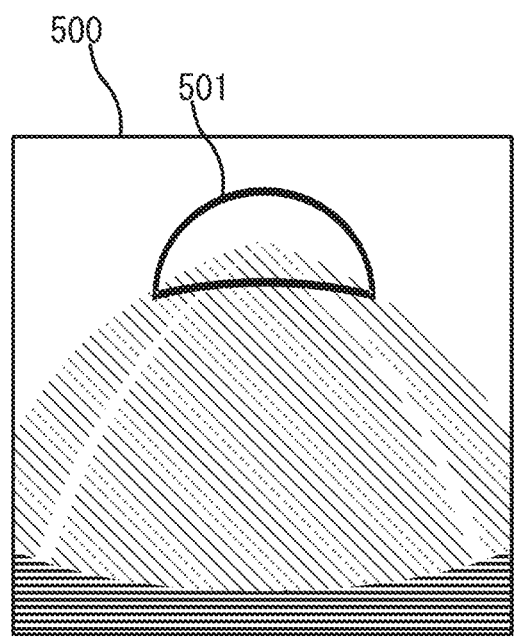

FIG. 10 presents an example of a processing area that may be set in step S410. The processing area set by the light source environment detection unit 144 changes depending upon whether the light source environment detection is executed during daytime or nighttime. FIG. 10 shows an example of a processing area 501 set in a captured image 500 during daytime. The processing area 501 is set so as to include the sky. The light source environment detection unit 144 sets the processing area at nighttime by restricting it but still allowing it to include headlights from a vehicle behind the subject vehicle.

(Traveling Road Environment Detection Unit 145)

The traveling road environment detection unit 145 detects an environment such as the traveling road conditions and the background conditions, in which the reliability indices $R_1$, $R_2$ $R_3$ and $R_4$, determined based upon the detection results provided by the accumulation detection unit 13 are likely to decrease readily. The traveling road environment detection unit 145 may detect, for instance, that the vehicle is currently traveling through an area where accumulations are likely to settle on the camera lenses, e.g., traveling on a wet road or traveling off road.

Figure 11:
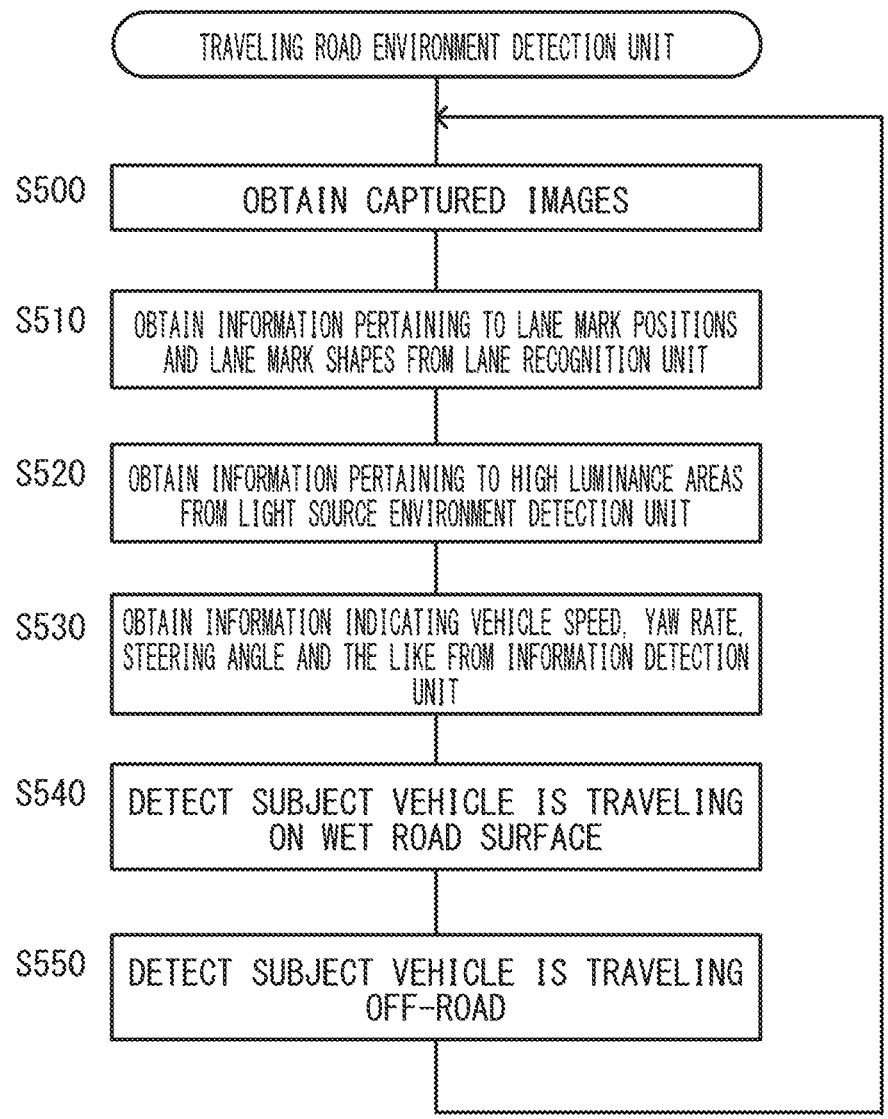

The traveling road environment detection unit 145 may execute processing as shown in the flowchart presented in FIG. 11. In step S500, the light source environment detection unit 144 obtains captured images from the cameras 2a and 2b. In step S510, the traveling road environment detection unit 145 obtains information pertaining to lane mark positions and lane mark shapes from the lane recognition unit 161. In step S520, the traveling road environment detection unit 145 obtains information related to high luminance areas detected by the light source environment detection unit 144. In step S530, the traveling road environment detection unit 145 obtains information indicating the outside air temperature, the subject vehicle speed, the yaw rate, the steering angle and the like from the information detection unit 12.

In step S540, the traveling road environment detection unit 145 detects, based upon the information pertaining to the lane mark positions and the lane mark shapes having been obtained in step S510, the information pertaining to the high luminance areas having been obtained in step S520 and the information indicating the outside air temperature, the subject vehicle speed, the yaw rate, the steering angle and the like having been detected in step S530, that the subject vehicle is currently traveling on a wet road surface. The traveling road environment detection unit 145 may detect a wet road surface by, for instance, determining an image area corresponding to the road surface based upon the information pertaining to the lane mark positions and the lane mark shapes and assuming a high luminance area detected in the road surface image area to be a puddle or an icy patch on the road surface. The traveling road environment detection unit 145 detects, based upon the information related to the subject vehicle speed, that the subject vehicle is currently in a traveling state. The traveling road environment detection unit 145 may also judge, based upon the information related to the outside air temperature, that the wet road surface is also icy if the temperature is lower than the freezing point.

In step S550, the traveling road environment detection unit 145 detects that the subject vehicle is traveling off-road if no information pertaining to lane mark positions and lane mark shapes has been obtained in step S510 in a traveling state, few buildings are present in the captured images having been obtained in step S500 and the like even as the vehicle has remained in a traveling state. The traveling road environment detection unit 145 then proceeds to step S500 to obtain images captured for succeeding frames.

(Weather Detection Unit 146)

Figure 12:
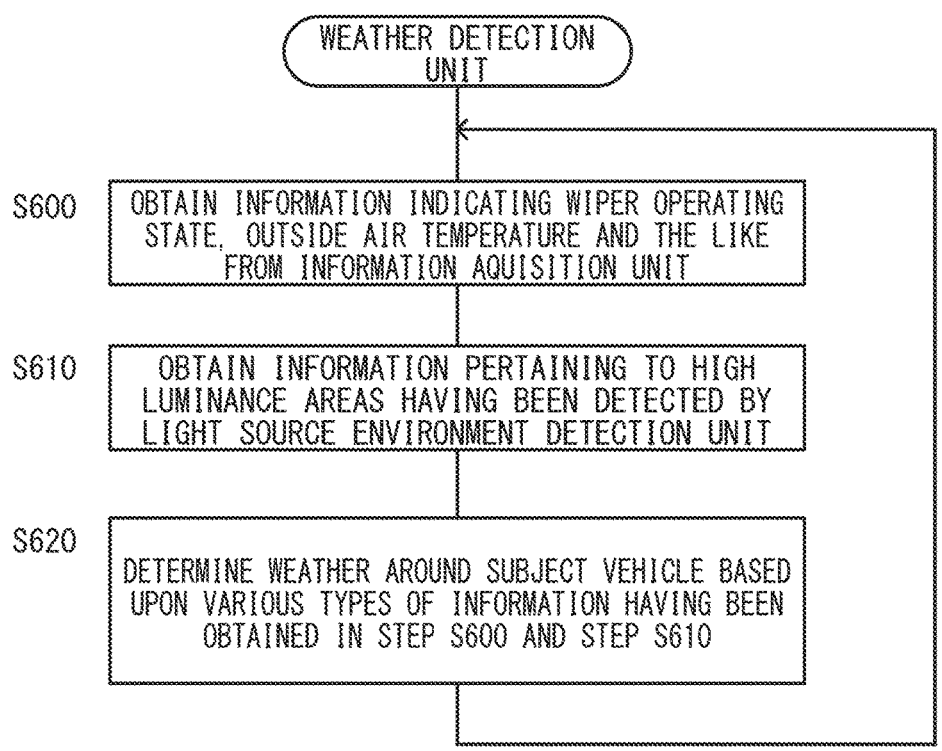

The weather detection unit 146 obtains information pertaining to the weather conditions around the subject vehicle. FIG. 12 presents a flowchart of the processing executed by the weather detection unit 146. In step S600, the weather detection unit 146 obtains information indicating the wiper operating state, the outside air temperature and the like from the information detection unit 12. In step S610, the weather detection unit 146 obtains information pertaining to high luminance areas detected by the light source environment detection unit 144.

In step S620, the weather detection unit 146 detects weather conditions around the subject vehicle based upon the various types of information having been obtained in step S600 and step S610 and outputs weather information as detection results. It may judge that it is raining if the windshield wipers are operating at a rate equal to or greater than a predetermined value within a predetermined length of time. In addition, it may judge that the weather around the subject vehicle is fair if the light source environment detection unit 144 detects high luminance areas at the road surface with a frequency equal to or greater than a predetermined value within a predetermined length of time. After making a decision on the weather conditions, the weather detection unit 146 proceeds to execute the processing in step S600.

(Time Control Unit 147)

The time control unit 147 measures various lengths of time as listed below.

(a) The lengths of time over which various units in the image recognition unit 16 are engaged in operation.

(b) The length of time having elapsed since the non-detection countermeasures or the erroneous detection countermeasures were started in a specific phase of suppression mode at the image recognition unit 16.

(c) The lengths of time having elapsed since the removal control unit 4 started accumulation removal.

(d) The lengths of time having elapsed since the various units in the image recognition unit 16 abandoned image recognition.

(e) The lengths of time t1, t2, t4 and t5 having elapsed since the detection results were initialized (reset) at the accumulation detection unit 13.

(f) The length of time having elapsed since the accumulation detection unit 13 stopped detection.

Since the subject vehicle needs to be in a traveling state as a prerequisite for processing execution at the various units in the accumulation detection unit 13, the detection processing is suspended when the vehicle speed is equal to or less than a predetermined value. When the detection processing by the accumulation detection unit 13 has been suspended over a length of time equal to or greater than a predetermined time length, the reliability of the detection results provided via the various units in the accumulation detection unit 13 becomes low. For instance, since water drops may dry up and thus disappear after several hours, the detection results output from the water drop detection unit 131 cannot be relied upon after several hours following the suspension of operation by the water drop detection unit 131. The in-vehicle device 1 initializes the detection results provided via the water drop detection unit 131 once a length of elapsed time $t_6$, measured by the time control unit 147, becomes equal to a predetermined time length.

(Detection Results Control Unit 148)

Figure 13:
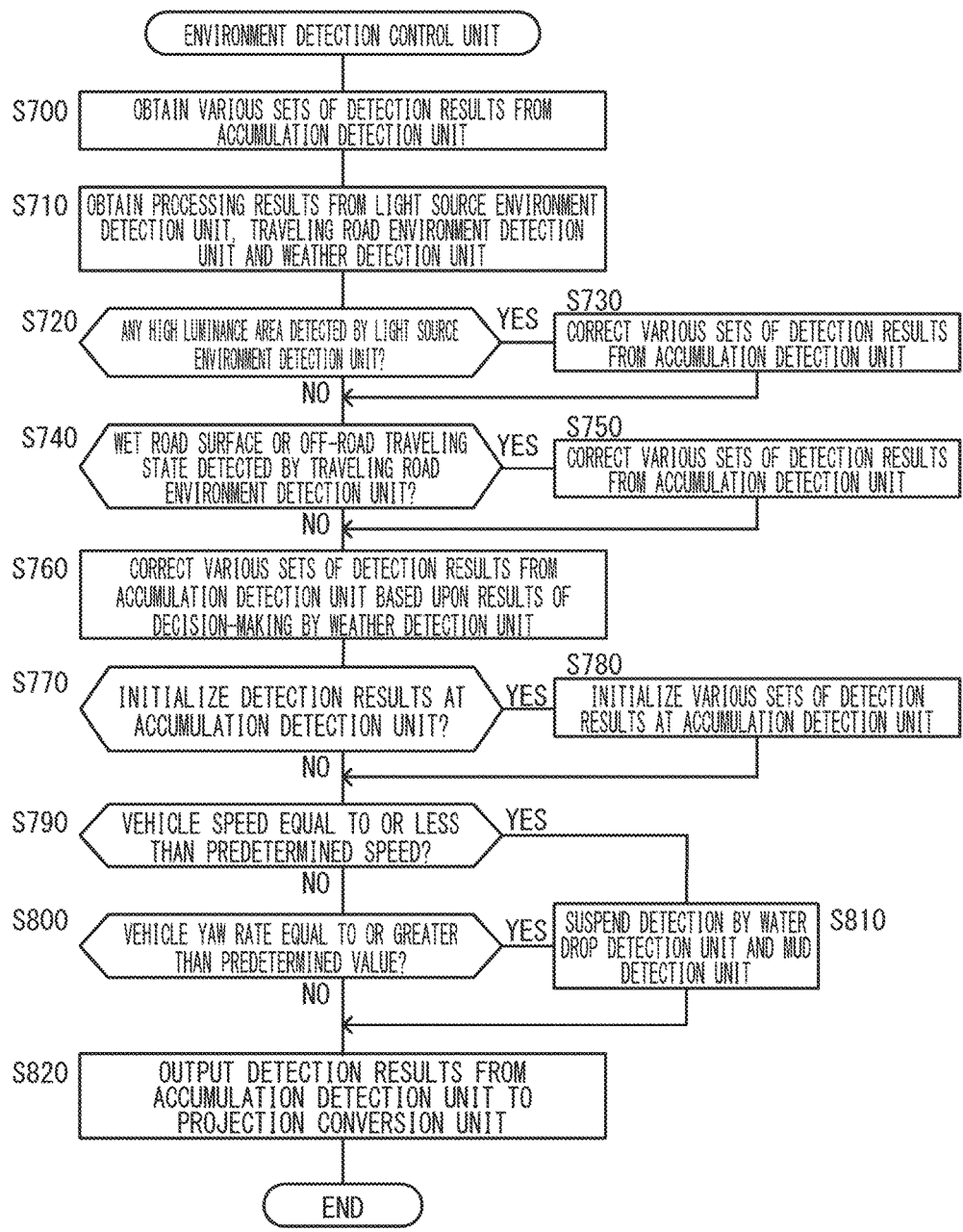

The detection results control unit 148 executes control such as correction and initialization for the detection results provided via the various units in the accumulation detection unit 13. FIG. 13 presents a flowchart related to the processing at the accumulation detection unit 13. In step S700, the detection results control unit 148 obtains the individual sets of detection results from the various units in the accumulation detection unit 13.

In step S710, the detection results control unit 148 obtains the processing results from the light source environment detection unit 144, the traveling road environment detection unit 145 and the weather detection unit 146. The information obtained by the detection results control unit 148 includes, for instance, the information pertaining to high luminance areas extracted by the light source environment detection unit 144 in step S450 (see FIG. 9), the detection results obtained by the traveling road environment detection unit 145 in step S540 (see FIG. 11) and step S550 (see FIG. 11) and the information pertaining to the weather conditions determined by the weather detection unit 146 in step S620 (see FIG. 12).

In step S720, the detection results control unit 148 makes a decision as to whether or not any high luminance area has been detected by the light source environment detection unit 144. If an affirmative decision is made in step S720, i.e., if a high luminance area has been detected by the light source environment detection unit 144, the detection results control unit 148 proceeds to execute the processing in step S730 in order to correct the detection results from the various units in the accumulation detection unit 13. The light source environment detection unit 144 extracts a light source that may cause a reflection off the road surface and also cause a glare, such as a light source from which glaring light originates from behind the vehicle, e.g., the setting sun or the rising sun, during daytime, or light from the headlamps of a vehicle behind the subject vehicle at night, and the detection results control unit 148 adjusts the reliability indices in correspondence to the characteristics of their logic based upon the extracted light source. The reliability index $R_1$ related to water drop detection is lowered to, for instance, approximately ⅔ of the reliability index under normal circumstances, since an area where light is reflected off the road surface may be erroneously detected as a water drop. Both the score and the reliability index for clouding detection are adjusted by excluding an area directly behind a high luminance area attributable to, for instance, the setting sun or a headlamp of a vehicle behind the subject vehicle that creates back lighting conditions at the cameras during daytime from the clouding detection area. However, when the light source is large, the score attributable to clouding itself tends to go up, and for this reason, if the light source area is equal to or greater than a predetermined value, the reliability index $R_2$ is lowered by, for instance, 20%. Next, the reliability index $R_3$ used in water stain detection is adjusted to ensure that it does not take a large value if a water stain is not detected over a greater length of time by setting the time length AS3THR used in the water stain detection to a larger value, so as to preempt the risk of erroneously detecting sunlight or light reflected off the road surface as a water stain. Lastly, while a setting is selected so as not to use an area around a high luminance area for mud detection, the reliability index corresponding to the mud detection is not directly adjusted. The rationale for this is that if the luminance does not greatly change in a relatively low luminance area surrounded by a bright area, it can be assumed that the background cannot be observed due to the presence of some type of accumulation. Once the correction is completed, the detection results control unit 148 proceeds to execute the processing in step S740. If a negative decision is made in step S720, the detection results control unit 148 proceeds to execute the processing in step S740.

In step S740, the detection results control unit 148 makes a decision as to whether or not a wet road surface or an off-road condition has been detected by the traveling road environment detection unit 145. If an affirmative decision is made in step S740, i.e., if a wet road surface or an off-road condition has been detected, the detection results control unit 148 proceeds to step S750 to correct the detection results from the various units in the accumulation detection unit 13. If a wet road surface has been detected, for instance, it may increase the reliability index $R_1$ for the detection results provided by the water drop detection unit 131 by 50%, whereas if an off-road condition has been detected, it may increase the reliability index $R_4$ for the detection results provided by the mud detection unit 144 by 50%. Once the correction is completed, the detection results control unit 148 proceeds to execute the processing in step S760. Upon making a negative decision in step S740, the detection results control unit 148 proceeds to execute the processing in step S760.

In step S760, the detection results control unit 148 corrects the detection results provided via the various units in the accumulation detection unit 13 based upon the detection results output by the weather detection unit 146. For instance, if it is raining around the subject vehicle, it increases the reliability index $R_1$ for the detection results provided by the water drop detection unit 131. In addition, if the weather conditions surrounding the subject vehicle change from rain to sunshine, it increases the reliability index $R_3$ for the detection results provided by the water stain detection unit 133. If the detection results provided by the weather detection unit 146 indicate rainy weather, the detection results control unit 148 increases the reliability index $R_1$ for water drop detection by, for instance, 50% and if the weather conditions are judged to be sunny, it lowers the reliability index $R_1$ by, for instance, 20%. Furthermore, if the temperature is equal to or lower than 0° C. in wet weather, snow instead of water may accumulate and block the background view. Under such circumstances, snow is detected as mud or a water stain rather than a water drop. For this reason, if the weather conditions are judged to be rainy with a temperature equal to or lower than 0° C., the reliability indices for water drop detection, mud detection and water stain detection are each increased by 50%.

In step S770, the detection results control unit 148 makes a decision as to whether or not to initialize the detection results from the various units in the accumulation detection unit 13. An affirmative decision is made in step S770 if, for instance, at least a predetermined length of time has elapsed since a high luminance area was last detected by the light source environment detection unit 144, if the subject vehicle determined to have continuously remained in a stationary state over a predetermined length of time or longer is starting up (more specifically, if the traveling speed of the subject vehicle, having continuously remained at a predetermined speed, e.g., 10 km/h or lower, over the predetermined length of time, has risen to a speed equal to or higher than the predetermined value) or the like. Upon making an affirmative decision in step S770, the detection results control unit 148 proceeds to step S780 to initialize the individual sets of detection results at the accumulation detection unit 13 before proceeding to execute the processing in step S790. If, on the other hand, a negative decision is made in step S770, the detection results control unit 148 proceeds to execute the processing in step S790.

In step S790, the detection results control unit 148 makes a decision as to whether or not the current vehicle speed is equal to or lower than a predetermined speed, e.g., equal to or lower than 10 km/h. If an affirmative decision is made in step S790, i.e., if the vehicle speed is equal to or less than the predetermined speed, the detection results control unit 148 proceeds to execute the processing in step S810. If, on the other hand, a negative decision is made in step S790, the detection results control unit 148 proceeds to execute the processing in step S800.

In step S800, the detection results control unit 148 makes a decision as to whether or not the yaw rate at the vehicle is equal to or greater than a predetermined value. If an affirmative decision is made in step S800, i.e., if the yaw rate at the vehicle is equal to or greater than the predetermined value, the detection results control unit 148 proceeds to execute the processing in step S810. Upon making a negative decision in step S800, the detection results control unit 148 proceeds to execute the processing in step S820.

In step S810, the detection results control unit 148 suspends accumulation detection by the water drop detection unit 131 and the mud detection unit 134. In step S820, the detection results control unit 148 outputs the various sets of detection results, having originated from the accumulation detection unit 13 and having undergone correction and the like, to the projection conversion unit 141. It is to be noted that if detection by the water drop detection unit 131 and the mud detection unit 134 has been suspended in step S810, no detection results from the water drop detection unit 131 and the mud detection unit 134 are output. In such a case, the projection conversion unit 141 simply projects only the detection results output thereto into the control map 50 and the composite coordinate setting unit 142 sets the composite coordinates (P, Q) simply by using the components attributable to the projection results.

(Lane Recognition Unit 161)

In reference to FIG. 14 and FIG. 15, the operation executed by the lane recognition unit 161 when neither the erroneous detection countermeasures nor the non-detection countermeasures are taken will be described.

Figure 14:
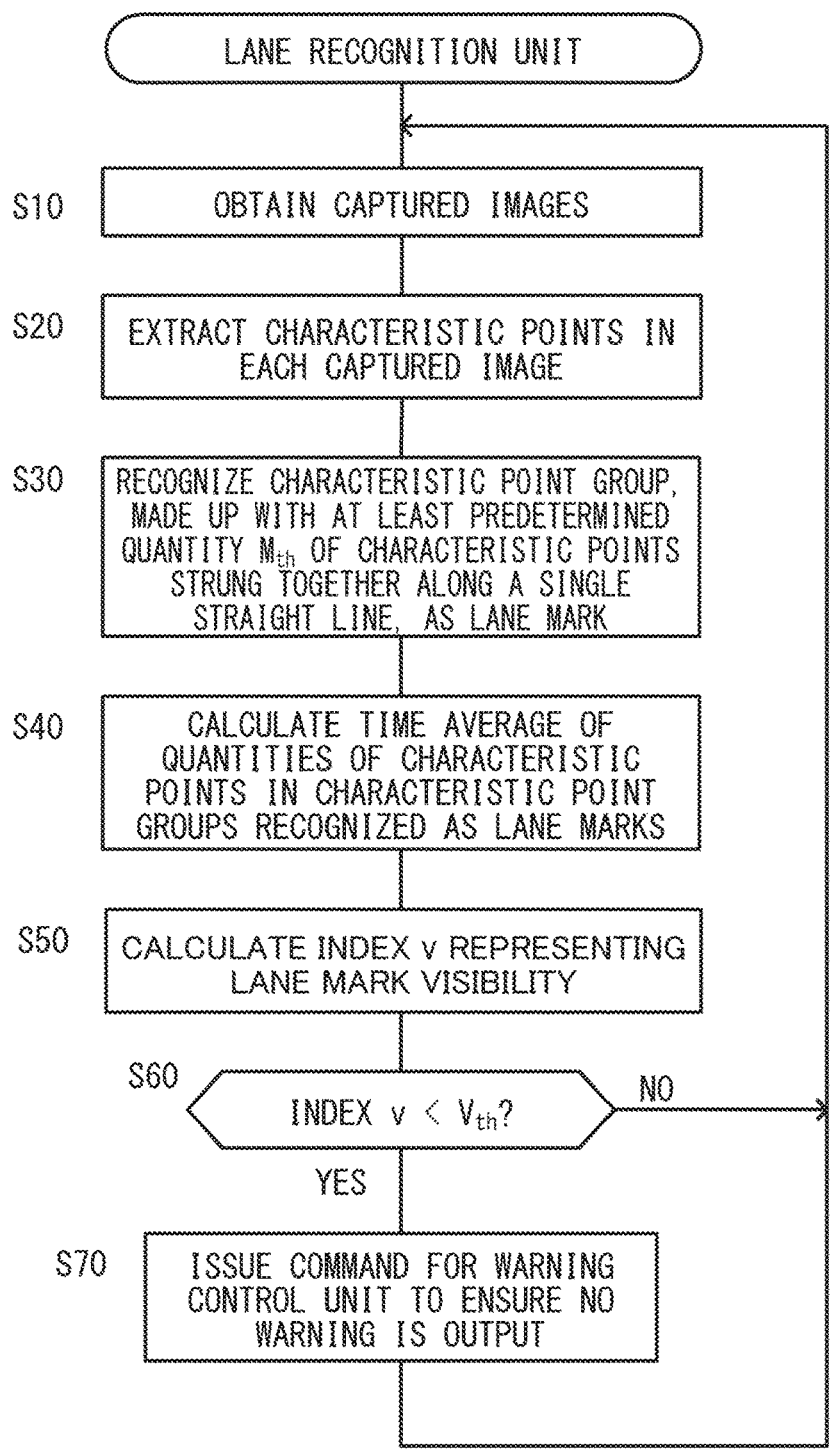

FIG. 14 presents a flowchart pertaining to the processing executed by the lane recognition unit 161. In step S10, the lane recognition unit 161 obtains captured images from the cameras 2a and 2b. In step S20, the lane recognition unit 161 extracts, from the captured images having been obtained in step S10, characteristic points that correspond to lane marks drawn to the left and to the right of the lane in which the subject vehicle is traveling on the road. The lane recognition unit 161 sets an extraction area over, for instance, a predetermined portion of each captured image and extracts edge points, manifesting luminance changes by extents equal to or greater than a predetermined threshold value, within the extraction area as characteristic points.

Figure 15:
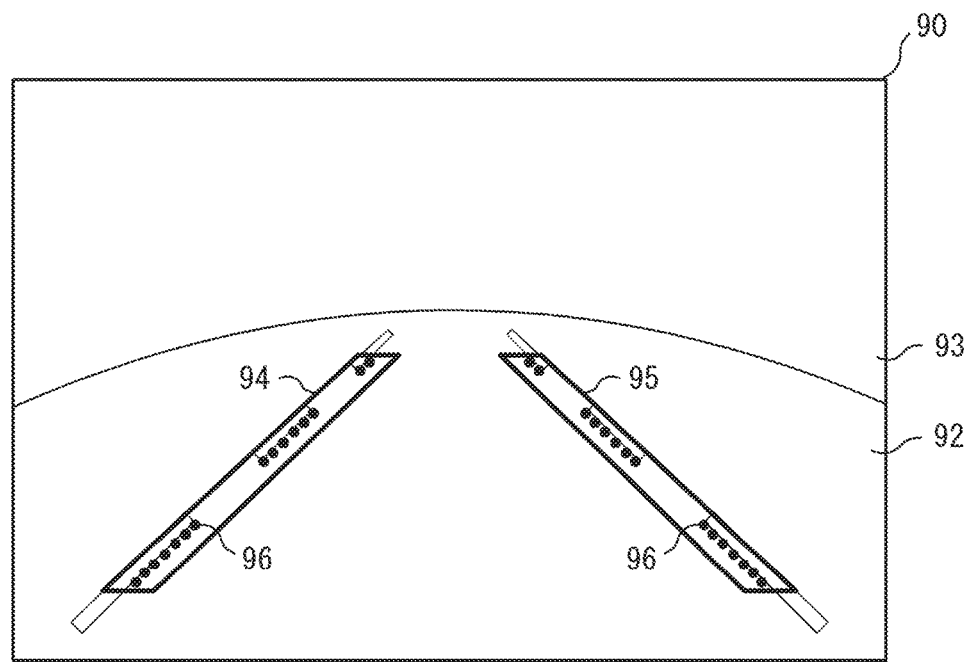

FIG. 15 presents an example of characteristic points that may have been extracted from a captured image. A captured image 90 in FIG. 15 includes a road surface image area 92 where the road surface is captured and a background image area 93 where the background is captured. In step S20 in FIG. 14, the lane recognition unit 161 sets an extraction area 94 corresponding to an area further inwards relative to the lane demarcation line located to the right of the subject vehicle and an extraction area 95 corresponding to an area further inward relative to the lane demarcation line located to the left of the subject vehicle, as indicated in FIG. 15. It then detects edge points by comparing the luminance values at pixels next to each other within the extraction areas 94 and 95 and extracts the detected edge points as characteristic points 96. As a result, a plurality of characteristic points are extracted along the inner edge line for each of the lane marks drawn on the left side and the right side.

In step S30 in FIG. 14, the lane recognition unit 161 recognizes a group of characteristic points, among the characteristic points having been extracted in step S20, made up with at least a predetermined quantity $M_{th}$ of characteristic points strung together along a single straight line, as a lane mark. In the example presented in FIG. 15, 11 characteristic points 96 are set successively along a single straight line in each of the extraction areas, i.e., the extraction area 94 and the extraction area 95. For instance, the predetermined quantity $M_{th}$ may be 5, and in such a case, the characteristic point groups in extraction areas 94 and 95 in the example presented in FIG. 15 are each recognized as a lane mark. The lane recognition unit 161 outputs information pertaining to the lane marks having been recognized in step S30 to the warning control unit 17 and the like.

In step S40, the lane recognition unit 161 calculates a time average of the quantity of characteristic points included in the characteristic point groups having been recognized as lane marks in step S30. For instance, records pertaining to the quantities of characteristic points included in the individual characteristic point groups having been recognized as lane marks in previous frames may be stored in the memory 10 and in such a case, the lane recognition unit 161 is able to calculate the time average for the characteristic point quantities based upon these records.

In step S50, the lane recognition unit 161 calculates an index v representing the visibility of lame marks based upon the time average of the characteristic point quantities having been calculated in step S40. In step S60, the lane recognition unit 161 makes a decision as to whether or not the index v representing the lane mark visibility is less than a predetermined threshold value $V_{th}$. If an affirmative decision is made in step S60, i.e., if the index v is less than the predetermined threshold value $V_{th}$, the lane recognition unit 161 proceeds to execute the processing in step S70. If, on the other hand, a negative decision is made in step S60, i.e., if the index v is equal to or greater than the predetermined threshold value $V_{th}$, the lane recognition unit 161 proceeds to execute the processing in step S10 to obtain images captured for succeeding frames from the cameras 2a and 2b.

In step S70, the lane recognition unit 161 outputs a command for the warning control unit 17 so as to ensure that no warning is output from the warning output unit 3, and then proceeds to execute the processing in step S10. In step S10, the lane recognition unit 161 obtains images captured for succeeding frames from the cameras 2a and 2b.

In the erroneous detection countermeasures taken in the first suppression mode, the operation control unit 15 sets the pre-determined quantity $M_{th}$ to a large value. As a result, the lane recognition unit 161 will not readily recognize a group of characteristic points strung together along a single straight line as a lane mark in step S30. In addition, it increases the value set for the threshold value $V_{th}$ so as to ensure that an erroneous warning is not output readily. The values set for the pre-determined quantity $M_{th}$ and the threshold value $V_{th}$ may be changed based upon the position defined by the composite coordinates (P, Q).

In the non-detection countermeasures taken in the first suppression mode, the operation control unit 15 sets the pre-determined quantity $M_{th}$ to a small value. As a result, the lane recognition unit 161 will readily recognize a group of characteristic points strung together along a single straight line as a lane mark in step S30. In addition, it sets a smaller value for the threshold value $V_{th}$ so as to ensure that the warning control unit 17 is able to more readily output a warning via the warning output unit 3. The values set for the pre-determined quantity $M_{th}$ and the threshold value $V_{th}$ may be changed based upon the position defined by the composite coordinates (P, Q).

In the erroneous detection countermeasures taken in the second suppression mode, the operation control unit 15 sets the pre-determined quantity $M_{th}$ to an even larger value relative to the value set for the first suppression mode. As a result, the lane recognition unit 161 will even less readily recognize a group of characteristic points strung together along a single straight line as a lane mark in step S30. In addition, the in-vehicle device 1 ensures that any area where an accumulation has been detected is not included in an image area designated as a target of the characteristic point extraction processing executed in step S20 or exempts any characteristic point, among the characteristic points having been extracted in step S20, that has been extracted from an area where an accumulation has been detected.

In the non-detection countermeasures taken in the second suppression mode, the operation control unit 15 sets the pre-determined quantity $M_{th}$ to an even smaller value relative to that set for the first suppression mode. As a result, the lane recognition unit 161 will even more readily recognize a group of characteristic points strung together along a single straight line as a lane mark.

In the erroneous detection countermeasures taken in the third suppression mode and in the non-detection countermeasures taken in the third suppression mode, the operation control unit 15 outputs a command for the removal control unit 4 so as to remove accumulations from the camera lenses. If the dirt build-up conditions at the camera lenses do not improve in spite of the accumulation removal operation executed by the removal control unit 4, the operation control unit 15 abandons the lane recognition by the lane recognition unit 161.

It is to be noted that the processing executed by the parking space recognition unit 165 in order to recognize parking space frames is similar to the processing executed by the lane recognition unit 161 in order to recognize lane marks as has been described in reference to FIG. 14. In addition, the erroneous detection countermeasures and the non-detection countermeasures taken by the parking space recognition unit 165 in the various suppression modes may be similar to the erroneous detection countermeasures and the non-detection countermeasures taken by the lane recognition unit 161 in the corresponding suppression modes.

(Vehicle Recognition Unit 162)

Figure 16:
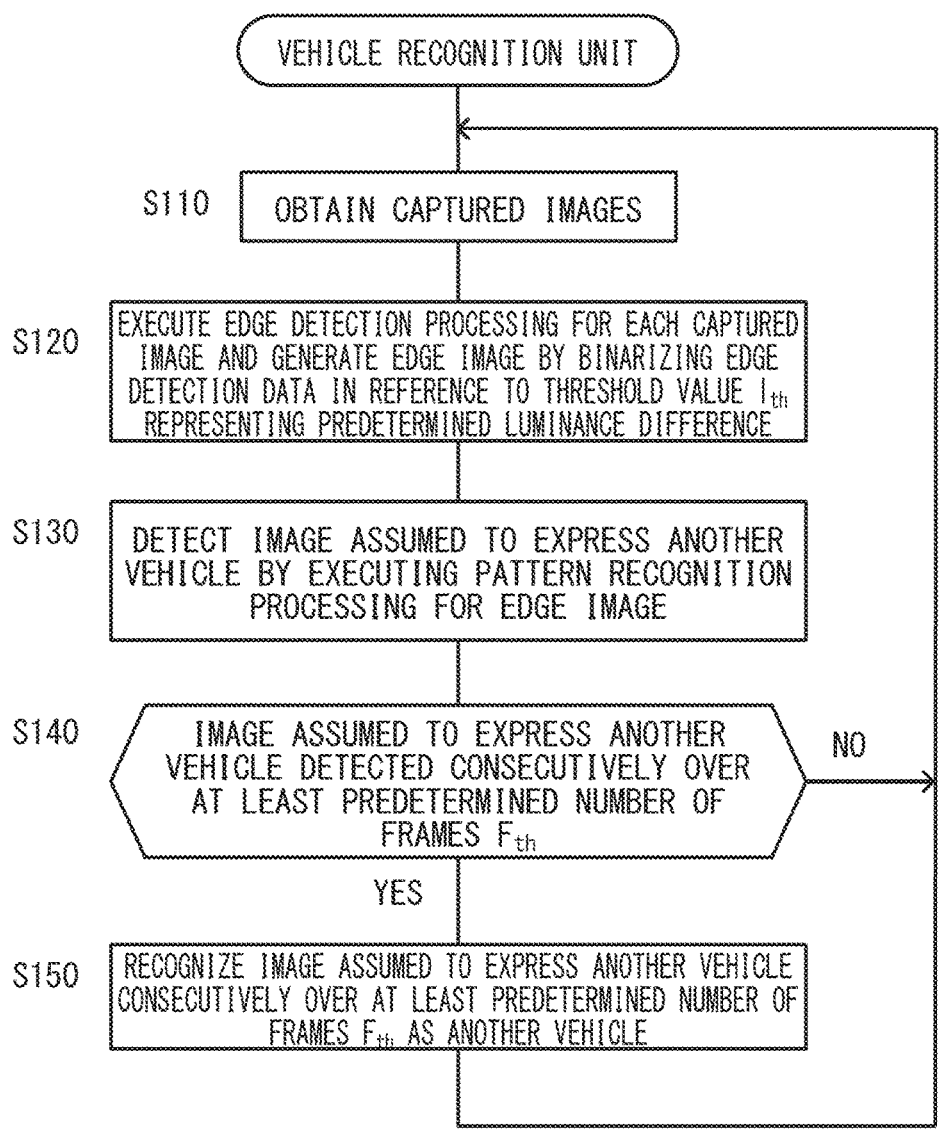

In reference to FIG. 16, the operation executed by the vehicle recognition unit 162 when neither the erroneous detection countermeasures nor the non-detection countermeasures are taken will be described. FIG. 16 presents a flowchart pertaining to the processing executed by the vehicle recognition unit 162.

In step S110, the vehicle recognition unit 162 obtains captured images from the cameras 2a and 2b. In step S120, the vehicle recognition unit 162 executes edge detection processing for each captured image having been obtained in step S110 and generates an edge image by binarizing the edge detection data in reference to a threshold value $l_{th}$ representing a predetermined luminance difference. In step S130, the vehicle recognition unit 162 executes pattern recognition processing for the edge image having been generated in step S120 so as to detect an image that can be assumed to express another vehicle.

In step S140, the vehicle recognition unit 162 makes a decision as to whether or not an image assumed to express another vehicle has been detected through step S130 over at least a predetermined number of successive frames $F_{th}$. If a negative decision is made in step S140, i.e., if an image assumed to express another vehicle has not been detected over at least the predetermined number of successive frames $F_{th}$, the vehicle recognition unit 162 proceeds to step S110 to obtain images captured for succeeding frames. If an affirmative decision is made in step S140, i.e., if an image assumed to express another vehicle has been detected over at least the predetermined number of successive frames $F_{th}$, the vehicle recognition unit 162 proceeds to execute the processing in step S150. In step S150, the vehicle recognition unit 162 recognizes the image assumed to express another vehicle over at least the predetermined number of successive frames $F_{th}$ as another vehicle. Subsequently, the vehicle recognition unit 162 proceeds to step S110 to obtain images captured for succeeding frames.

In the erroneous detection countermeasures taken in the first suppression mode, the operation control unit 15 sets a greater value for the predetermined number of frames $F_{th}$. By raising the value set for the predetermined number of frames $F_{th}$, it is ensured that the vehicle recognition unit 162 will not readily recognize the image having been assumed to express another vehicle in step S130 as an actual vehicle and thus, the likelihood of erroneous detection of another vehicle is lowered. The value set for the predetermined number of frames $F_{th}$ may be altered based upon the position defined by the composite coordinates (P, Q).

In the non-detection countermeasures taken in the first suppression mode, the operation control unit 15 sets a smaller value for the threshold value $l_{th}$ representing the predetermined luminance difference. As the value set for the threshold value $l_{th}$ representing the predetermined luminance difference is reduced, edges outlining another vehicle can be more readily detected and thus, the risk of another vehicle not being detected by the vehicle recognition unit 162 is lowered. The value set for the threshold value $l_{th}$ representing the predetermined luminance difference may be altered based upon the position corresponding to the composite coordinates (P, Q).

In the erroneous detection countermeasures taken in the second suppression mode, the operation control unit 15 excludes any area where an accumulation has been detected from the image area designated as the target for the processing executed in step S120 and step S130. In addition, the operation control unit 15 limits other vehicles to be detected by the vehicle recognition unit 162 to vehicles posing high levels of danger to the subject vehicle and exempts any other vehicle from detection. For instance, it may designate, as a detection target, only another vehicle traveling ahead of the subject vehicle in the same lane in the images captured via the camera 2a. In addition, it made designate, as a detection target, a vehicle traveling in the same lane as the subject vehicle and moving closer to the subject vehicle in the images captured via the camera 2b.

In the non-detection countermeasures taken in the second suppression mode, the operation control unit 15 sets an even smaller value for the threshold value $l_{th}$ representing the predetermined luminance difference relative to the value set for the first suppression mode. As an alternative, the vehicle recognition unit 162 may adopt another vehicle recognition method through which characteristic quantities representing characteristics of another vehicle can be detected even when the contrast in the captured images is low.

In the erroneous detection countermeasures taken in the third suppression mode and in the non-detection countermeasures taken in the third suppression mode, the operation control unit 15 outputs a command for the removal control unit 4 so as to remove accumulations from the camera lenses. If the dirt build-up conditions at the camera lenses do not improve in spite of the accumulation removal operation executed by the removal control unit 4, the operation control unit 15 abandons the vehicle recognition by the vehicle recognition unit 162.

It is to be noted that the processing executed by the pedestrian recognition unit 163 and the sign recognition unit 164 respectively to recognize a pedestrian and a road sign is similar to the processing executed by the vehicle recognition unit 162 in order to recognize another vehicle as has been described in reference to FIG. 16. In addition, the erroneous detection countermeasures and the non-detection countermeasures taken by the pedestrian recognition unit 163 and the sign recognition unit 164 in the various suppression modes may be similar to the erroneous detection countermeasures and the non-detection countermeasures taken by the vehicle recognition unit 162 in the corresponding suppression modes.

(Overall Flow)

Figure 17:
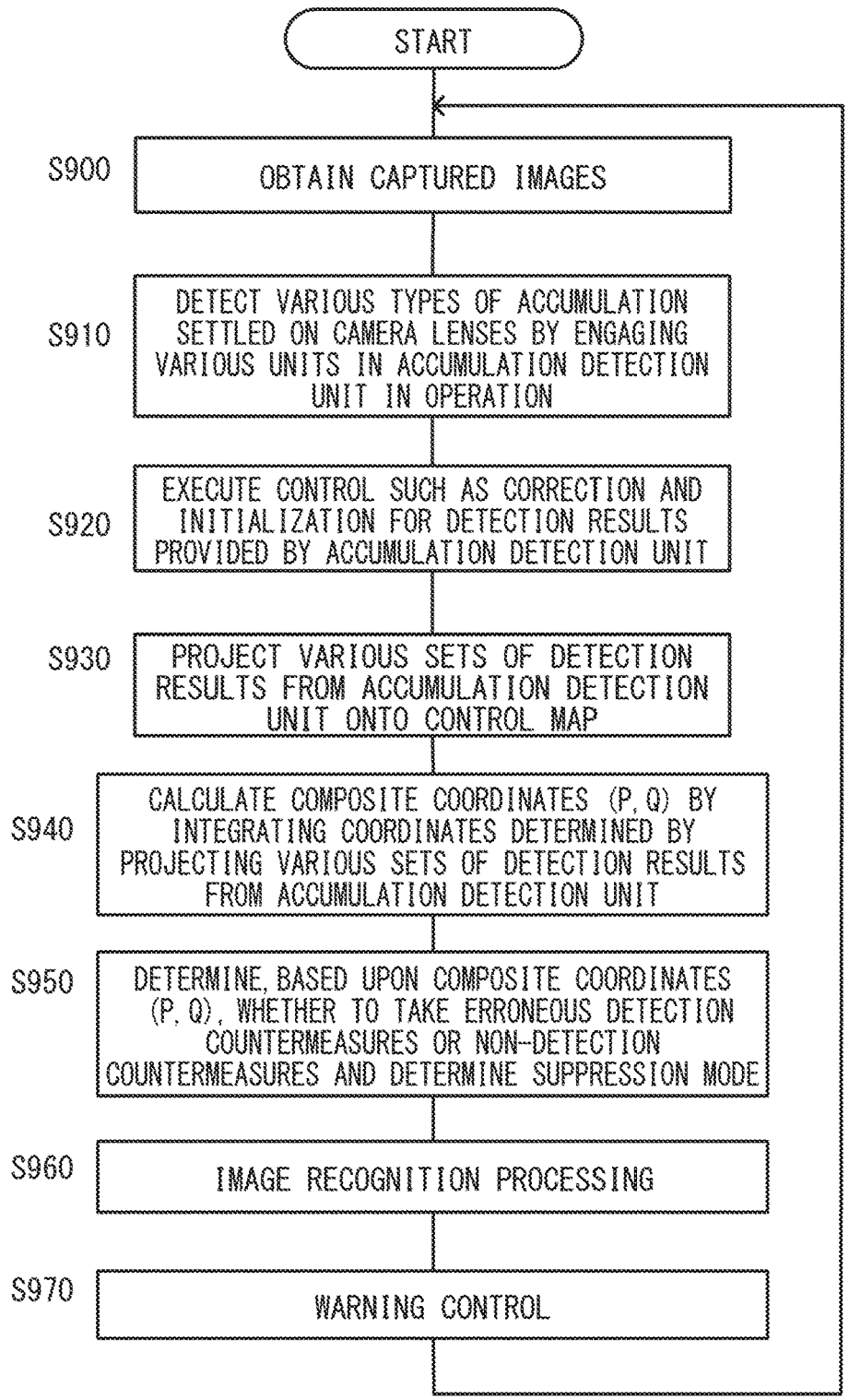

FIG. 17 presents a flowchart detailing the processing executed by the in-vehicle device 1. In step S900, the in-vehicle device 1 obtains captured images from the cameras 2a and 2b via the captured image acquisition unit 11. In step S910, the in-vehicle device 1 engages the accumulation detection unit 13 in operation to detect various types of accumulation present at the camera lenses of the cameras 2a and 2b and has the accumulation detection unit 13 output the detection results.

In step S920, the in-vehicle device 1 engages the detection results control unit 148 in operation to execute control such as correction and initialization for the detection results having been output in step S910. In step S930, the in-vehicle device 1 engages the projection conversion unit 141 in operation to project the various sets of detection results having originated from the accumulation detection unit 13 and having undergone the control processing in step S920 to the coordinate system on the control map 50.

In step S940, the in-vehicle device 1 engages the composite coordinate setting unit 142 in operation to calculate composite coordinates (P, Q) by integrating the coordinates resulting from the projection conversion in step S840. In step S950, the in-vehicle device 1 engages the operation control unit 15 in operation to determine whether to take the erroneous detection countermeasures or the non-detection countermeasures based upon the composite coordinates (P, Q) and also determine a specific suppression mode.

In step S960, the in-vehicle device 1 takes the countermeasures having been determined in step S950 and then executes image recognition processing by engaging the various units in the image recognition unit 16 in operation. In step S970, the in-vehicle device 1 controls the warning control unit 17 based upon the recognition results obtained through the image recognition processing having been executed in step S960. Subsequently, the in-vehicle device 1 proceeds to execute the processing in step S900.

The following advantages are achieved through the embodiment described above.

(1) The in-vehicle device 1 comprises an accumulation detection unit 13 that individually detects a plurality of types of accumulation in correspondence to lens dirt build-up conditions via, for instance, a water drop detection unit 131, a clouding detection unit 132, a water stain detection unit 133 and a mud detection unit 134, based upon a captured image obtained from a camera that captures images of the environment around the vehicle via a camera lens, an image recognition unit 16 that recognizes an image of a specific object present in the environment surrounding the vehicle, included in the captured image, a detection results integrating unit 14 that calculates integrated detection results by integrating a plurality of sets of detection results based upon various sets of detection results pertaining to the plurality of types of accumulation having been provided by the accumulation detection unit 13, and an operation control unit 15 that controls the operation executed by the image recognition unit 16 based upon the integrated detection results. This structure ensures that the image recognition unit 16 is not engaged in conflicting operations based upon the plurality of sets of detection results.

(2) The detection results integrating unit 14 individually projects the various sets of detection results originating from the accumulation detection unit 13 into a single coordinate system and sets composite coordinates (P, Q) on the coordinate system by combining the plurality of sets of coordinates each corresponding to one of the various sets of detection results. Based upon the composite coordinates thus set, the operation control unit 15 controls the operation executed by the image recognition unit 16. Namely, the detection results integrating unit 14 sets a single set of composite coordinates by combining the plurality of sets of detection results and the operation executed by the image recognition unit 16 is controlled based upon the composite coordinates. As a result, contradictory operational control, which might otherwise occur based upon the plurality of sets of detection results, is prevented.

(3) The coordinate system assumes a first coordinate axis pertaining to the lens transmission factor affected by lens accumulation and a second coordinate axis pertaining to the accumulation area at the camera lens. The various sets of detection results provided via the accumulation detection unit 13 are each represented by the lens transmission factor and the accumulation area, and a specific range to be taken for coordinates determined based upon each set of detection results represented by the two values is set for the corresponding type of accumulation. Such coordinate ranges are, for instance, the water drop range 51, the clouding range 52, the water stain range 53 and the mud range 54. Thus, the image recognition operation executed by the image recognition unit 16 can be optimally controlled based upon lens dirt build-up conditions.

The transmission factor affected by lens accumulation is a factor closely linked to erroneous detection by the various units in the image recognition unit 16, whereas the accumulation area is a factor closely linked to non-detection by the various units in the image recognition unit 16. Based upon the composite coordinates (P, Q) set in the coordinate system, assuming the coordinate axes representing the factors closely linked to erroneous detection and non-detection, the image recognition unit 16 can be controlled with high accuracy.

(4) The operation control unit 15 determines the type of control to be executed for the image recognition unit 16 based upon whether the composite coordinates are closer to the first coordinate axis or the second coordinate axis. For instance, the operation control unit 15 determines whether to take the non-detection countermeasures or the erroneous detection countermeasures as the control for the image recognition unit 16 based upon whether the operation selection range in which the composite coordinates (P, Q) are located is closer to the coordinate axis pertaining to the transmission factor or the coordinate axis pertaining to the accumulation area. Since distinct control designations are set as described above, conflicting situations in which the erroneous detection countermeasures and the non-detection countermeasures are both taken at the same time never occur.

(5) When the composite coordinates fall into a coordinate range indicating camera lens dirt build-up equal to or greater than a predetermined level, the operation control unit 15 suspends recognition of an image of a specific object by the image recognition unit 16. Alternatively, when the composite coordinates fall within the coordinate range indicating camera lens dirt build-up equal to or greater than the predetermined level, the operation control unit 15 engages removal devices to remove a plurality of types of accumulation from the camera lens.

For instance, when the composite coordinates (P, Q) fall into the operation selection range 75 or the operation selection range 76, the operation control unit 15 selects a third suppression mode for the suppression mode so as to suspend the lane mark recognition by the image recognition unit 16 (so as to abandon or give up the lane mark recognition) or to remove accumulations from the camera lens via the removal control unit 4. Through these measures, the risk of erroneous detection or non-detection by the image recognition unit 16 can be lowered.

(6) The accumulation detection unit 13 also calculates reliability indices, each corresponding to the length of time over which one of the plurality of types of accumulation has been continuously detected and the detection results integrating unit 14 calculates the integrated detection results by using the various reliability indices calculated by the accumulation detection unit 13, as well.

The various units in the accumulation detection unit 13 calculate the reliability indices based upon the lengths of time over which the corresponding types of accumulation have been continuously detected. For instance, the water drop detection unit 131 calculates a reliability index $R_1$ based upon an average score $A_{S1}$ that increases for each subsequent frame if a water drop is continuously present at the camera lens. The clouding detection unit 132 calculates a reliability index $R_2$ based upon the average continuous time length t3. The water stain detection unit 133 calculates a reliability index $R_3$ based upon an average score $A_{s3}$ that increases for each subsequent frame if a water stain is continuously present at the camera lens. The mud detection unit 134 calculates a reliability index $R_4$ based upon an average score $A_{S4}$ that increases for each subsequent frame if med is continuously present at the camera lens. The composite coordinate setting unit 142 then sets the composite coordinates (P, Q) based upon the reliability indices $R_1$, $R_2$, $R_3$ and $R_4$ each calculated by one of the various units in the accumulation detection unit 13. By using the composite coordinates (P, Q) set based upon the reliability indices $R_1$, $R_2$, $R_3$ and $R_4$ as described above, the dirt accumulation conditions at the camera lens can be expressed with high accuracy.

(7) The in-vehicle device 1 includes an environment detection control unit 143 functioning as an environment detection unit that detects an environment in which reliability is bound to decrease due to a factor related to at least one of; the light source environment surrounding the vehicle, the road on which the vehicle is currently traveling and the weather, and also functioning as a reliability index correction unit that individually corrects, based upon the environment having been detected by the environment detection unit, the various reliability indices calculated by the accumulation detection unit 13.

The environment detection control unit 143 in the in-vehicle device 1 may include, for instance, a light source environment detection unit 144, a traveling road environment detection unit 145 and a weather detection unit 146 configuring the environment detection unit, and a detection results control unit 148 functioning as the reliability index correction unit. Based upon the detection results provided by the light source environment detection unit 144, the traveling road environment detection unit 145 and the weather detection unit 146, the environment detection control unit 143 engages the detection results control unit 148 in operation so as to correct the various reliability indices individually calculated by the corresponding units in the accumulation detection unit 13 (step S730, step S750 in FIG. 13). Through these measures, the camera lens dirt build-up conditions can be expressed with high accuracy by using the composite coordinates (P, Q), even when the vehicle and the camera are in an environment where the reliability indices $R_1$, $R_2$, $R_3$ and $R_4$ pertaining to the detection results provided by the accumulation detection unit 13 tend to decrease readily.

(8) The in-vehicle device 1 further comprises an information detection unit 12 that obtains information pertaining to traveling conditions including, at least, the vehicle speed or the yaw rate, and an environment detection control unit 143 that functions as a detection suspending unit that suspends, based upon the information pertaining to the traveling conditions obtained by the information detection unit 12, detection of some accumulations among the plurality of types of accumulation by the accumulation detection unit. The detection results integrating unit 14 then calculates the integrated detection results based upon the accumulation detection results obtained by detecting accumulations among the plurality of types of accumulation, the detection of which has not been suspended.

For instance, the environment detection control unit 143 in the in-vehicle device 1 may suspend, based upon the information pertaining to the traveling conditions obtained by the information detection unit 12, accumulation detection by the water drop detection unit 131 and the mud detection unit 134 (step S810 in FIG. 13). In this situation, the composite coordinate setting unit 142 sets the composite coordinates (P, Q) based upon the accumulation detection results provided by the clouding detection unit 132 and the water stain detection unit 133 in the accumulation detection unit 13, accumulation detection by which has not been suspended. Through these measures, the composite coordinate setting unit 142 is able to minimize the extent to which the accuracy of the composite coordinates (P, Q) is lowered under specific vehicle traveling conditions.

(9) The in-vehicle device 1 includes an environment detection control unit 143 functioning as a stationary state decision-making unit which determines, based upon the information pertaining to the vehicle speed obtained by the information detection unit 12, that the vehicle is in a stationary state and also functioning as an initializing unit that initializes the detection results provided by the accumulation detection unit 13 when the vehicle, having been determined by the stationary state decision-making unit to have remained stationary over a length of time equal to or a predetermined time length, starts up.

The environment detection control unit 143 may determine, via the detection results control unit 148, that the vehicle is in a stationary state based upon, for instance, the information pertaining to the vehicle speed obtained from the information detection unit 12 (step S770 in FIG. 13) and initialize the various sets of detection results provided by the accumulation detection unit 13 (step S780) if the vehicle having remained in the stationary state (at 10 km/h or less) over a predetermined length of time is starting up (the vehicle speed rising to 10 km/h or higher). Through these measures, a high level of accuracy is assured with regard to the composite coordinates (P, Q).

The embodiment described above allows for the following variations.

While the cameras 2a and 2b are set up so as to capture images of the road ahead of and behind the vehicle, images of road surfaces to the left or to the right relative to the vehicle may also be captured. In addition, as long as images of the road surface around the vehicle can be captured, the cameras may be installed at any positions and their photographic ranges may be set freely.

In the embodiment described above, the various units in the accumulation detection unit 13 detect accumulations in each frame and output detection results in correspondence to each frame. However, the processing load may be reduced by allocating part of the processing at the accumulation detection unit 13 to be executed over the remaining time still available following the execution of the processing by the various units in the image recognition unit 16 in correspondence to each frame.

While the environment detection control unit 143 includes the light source environment detection unit 144, the traveling road environment detection unit 145, the weather detection unit 146, the time control unit 147 and the detection results control unit 148, it may only include at least one of; the light source environment detection unit 144, the traveling road environment detection unit 145 and the weather detection unit 146, instead of all three of them.

While the coordinate axis pertaining to the transmission factor and the coordinate axis pertaining to the accumulation area are taken in the control map 50, coordinate axes that may be assumed in the control map 50 are not limited to this particular combination. In other words, a combination of coordinate axes pertaining to other factors may be adopted, as long as the combination includes a coordinate axis pertaining to a first factor closely linked to erroneous detection by the various units in the image recognition unit 16 and a coordinate axis pertaining to a second factor closely linked to non-detection by the various units in the image recognition unit 16. Furthermore, the number of coordinate axes taken in the control map 50 does not need to be two. The control map 50 may include an additional axis pertaining to, for instance, reliability.

The methods adopted in the calculation of the reliability indices pertaining to the detection results provided by the water drop detection unit 131, the clouding detection unit 132, the water stain detection unit 133 and the mud detection unit 134 are not limited to those described earlier.

It is to be noted that the embodiment and variations thereof described above simply represent examples and the present invention is in no way limited to these examples. In addition, the embodiment and variations described above may be adopted in any combination or mode conceivable within the technical range of the present invention as long as the features characterizing the present invention remain intact.

The disclosure of the following priority application is herein incorporated by reference: Japanese Patent Application No. 2013-149747 filed Jul. 18, 2013

REFERENCE SIGNS LIST

1 in-vehicle device
2a, 2b camera
10 memory
11 captured image acquisition unit
12 information detection unit
13 accumulation detection unit
14 detection results integrating unit
15 operation control unit
16 image recognition unit
17 warning control unit
50 control map
51 water drop range
52 clouding range
53 water stain range
54 mud range
71, 72, 73, 74, 75, 76 operation selection range
77 worst dirt build-up point
131 water drop detection unit
132 clouding detection unit
133 water stain detection unit
134 mud detection unit
141 projection conversion unit
142 composite coordinate setting unit
143 environment detection control unit
144 light source environment detection unit
145 traveling road environment detection unit
146 weather detection unit
147 time control unit
148 detection results control unit
161 lane recognition unit
162 vehicle recognition unit
163 pedestrian recognition unit
164 sign recognition unit
165 parking space recognition unit

The invention claimed is:

1. An in-vehicle device, comprising:
an image acquisition unit that obtains a captured image from a camera that captures, via a camera lens, an image of a surrounding environment around a vehicle;
an accumulation detection unit that individually detects a plurality of types of accumulation settled at the camera lens based upon the captured image and generates a plurality of sets of detection results, each corresponding to one of the plurality of types of accumulation;
an image recognition unit that recognizes an object image, expressing a specific object present in the surrounding environment, in the captured image;
an integrated unit that receives a plurality of sets of detection results from the accumulation detection unit and forwards the received plurality of detection results to the image recognition unit via an operation control unit,
wherein: the image recognition unit under control of the operation control unit processes the plurality of sets of detection results, and the integrating unit individually projects the plurality of sets of detection results provided by the accumulation detection unit onto a single coordinate system and sets composite coordinates on the coordinate system based upon a plurality of sets of coordinates obtained through projection and whether the composite coordinates are closer to a first coordinate axis or to a second coordinate axis.

2. The in-vehicle device according to claim 1, wherein:
the coordinate system indicates the first coordinate axis pertaining to a lens transmission factor affected by the accumulations and the second coordinate axis pertaining to an accumulation area occupied by accumulations settled on the camera lens; and
the plurality of sets of detection results provided by the accumulation detection unit are each represented by the lens transmission factor and the accumulation area, and a range to be assumed for coordinates determined based upon the detection results represented by two values is individually set in correspondence to each of the plurality of types of accumulation.

3. An in-vehicle device according to claim 2, wherein:
when the composite coordinates fall into a range defined by an operation selection range set in advance within the range determined by the first coordinate axis and the second coordinate axis, the operation control unit suspends recognition of the object image expressing the specific object by the image recognition unit.

4. An in-vehicle device according to claim 2, wherein:
when the composite coordinates fall into a range defined by an operation selection range set in advance within the range determined by the first coordinate axis and the second coordinate axis, the operation control unit engages a removal device in operation to remove accumulations from the camera lens.

5. The in-vehicle device according to claim 1, wherein:
the accumulation detection unit further calculates reliability indices each corresponding to a length of time over which one of the plurality of types of accumulation has been continuously detected; and
the detection results integrating unit calculates the integrated detection results by using the reliability indices calculated by the accumulation detection unit as well.

6. The in-vehicle device according to claim 5, further comprising:
an environment detection unit that detects an environment in which the reliability indices are bound to decrease due to a factor related to at least one of; a light source environment around the vehicle, a traveling road upon which the vehicle is traveling and weather; and
a reliability index correction unit that individually corrects, based upon the environment detected by the environment detection unit, the reliability indices calculated by the accumulation detection unit.

7. The in-vehicle device according to claim 1, further comprising:
an information detection unit that obtains information pertaining to traveling conditions that include at least a speed of the vehicle or a yaw rate of the vehicle; and
a detection suspending unit that suspends, based upon the information pertaining to the traveling conditions obtained by the information detection unit, detection of some accumulation among the plurality of types of accumulation, wherein:
the detection results integrating unit calculates the integrated detection results based upon accumulation detection results pertaining to accumulations, among the plurality of types of accumulation, detection of which has not been suspended by the detection suspending unit.

8. The in-vehicle device according to claim 7, further comprising:
a stationary state decision-making unit that determines, based upon the information pertaining to the speed of the vehicle obtained by the information detection unit, that the vehicle is in a stationary state; and
an initializing unit that initializes the detection results provided by the accumulation detection unit when the vehicle, determined to have been continuously in a stationary state over a length of time equal to or greater than a predetermined time length by the stationary state decision-making unit, starts up.

\* \* \* \* \*